US012797735B2

(12) United States Patent
Lian

(10) Patent No.: US 12,797,735 B2

(45) Date of Patent: Nov. 17, 2026

(54) VIRTUAL CHARACTER TRACING METHOD AND APPARATUS, STORAGE MEDIUM, DEVICE, AND PROGRAM PRODUCT

(71) Applicant: Tencent Technology (Shenzhen) Company Limited, Shenzhen (CN)

(72) Inventor: Jianfeng Lian, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 254 days.

(21) Appl. No.: 18/740,364

(22) Filed: Jun. 11, 2024

(65) Prior Publication Data

US 2024/0325906 A1 Oct. 3, 2024

Related U.S. Application Data

(63) Continuation of application No. PCT/CN2023/082978, filed on Mar. 22, 2023.

(30) Foreign Application Priority Data

May 25, 2022 (CN) ......................... 202210577499.7

(51) Int. Cl.
*A63F 13/00* (2014.01)
*A63F 13/5378* (2014.01)

(52) U.S. Cl.
CPC ................................ *A63F 13/5378* (2014.09)

(58) Field of Classification Search
None
See application file for complete search history.

(56) References Cited

U.S. PATENT DOCUMENTS 6,582,299 B1 * 6/2003 Matsuyama ............ A63F 13/53 463/2
7,850,525 B2 * 12/2010 Shimizu .................. A63F 13/57 463/31

(Continued)

FOREIGN PATENT DOCUMENTS

CN 111265869 A 6/2020
CN 112121414 A 12/2020

(Continued)

OTHER PUBLICATIONS

Search Notes (Year: 2026).*
CN 112121414 machine translation (Year: 2020).*
Tencent Technology, ISR, PCT/CN2023/082978, May 24, 2023, 3 pgs.

*Primary Examiner* — Paul A D'Agostino

(74) *Attorney, Agent, or Firm* — Morgan, Lewis & Bockius LLP

(57) ABSTRACT

This application discloses a virtual character tracing method performed by an electronic device. The method includes: displaying a virtual scene and a mini-map picture, the virtual scene including a first virtual character; in response to a target trigger operation, controlling the first virtual character to launch a first virtual attack item at a second virtual character in a different camp from the first virtual character; and displaying a movement of a position of the second virtual character in the mini-map picture after the second virtual character is hit by the first virtual attack item. This application resolves a technical problem that efficiency of tracing a virtual character is low in the related art.

19 Claims, 15 Drawing Sheets

(56) References Cited

U.S. PATENT DOCUMENTS 8,262,477 B2 * 9/2012 Koganezawa ........ A63F 13/837 463/2
8,401,225 B2 * 3/2013 Newcombe ............. G06T 7/215 382/100
8,570,320 B2 * 10/2013 Izadi ....................... G06T 17/00 345/420
8,587,583 B2 * 11/2013 Newcombe ............. G06T 17/00 345/422
10,183,222 B2 * 1/2019 Tsui ...................... A63F 13/837
2004/0259636 A1 * 12/2004 Machida ................. A63F 13/10 463/30
2007/0218966 A1 * 9/2007 Tilston ................ A63F 13/5378 463/5
2008/0009352 A1 * 1/2008 Aoyama ............... A63F 13/358 463/43
2008/0064500 A1 * 3/2008 Satsukawa .............. A63F 13/98 320/137
2008/0070686 A1 * 3/2008 Satsukawa .......... A63F 13/5255 463/37
2009/0011808 A1 * 1/2009 Ikematsu .............. A63F 13/426 463/2
2013/0109472 A1 * 5/2013 Tabata .................... A63F 13/40 463/31
2013/0217498 A1 * 8/2013 Wang .................. A63F 13/2145 463/37
2014/0011585 A1 * 1/2014 Ando ...................... A63F 13/00 463/31
2014/0089243 A1 * 3/2014 Oppenheimer .... G08B 13/2428 706/46
2014/0295941 A1 * 10/2014 Takahashi ............. A63F 13/493 463/24
2014/0370948 A1 * 12/2014 Noh ........................ A63F 13/35 463/2
2016/0148433 A1 * 5/2016 Petrovskaya .......... G02B 27/01 345/633
2016/0171835 A1 * 6/2016 Washington ........ G07F 17/3223 463/25
2016/0271499 A1 * 9/2016 Higo ..................... A63F 13/822
2017/0001111 A1 * 1/2017 Willette .................. A63F 13/49
2017/0076553 A1 * 3/2017 Washington .......... A63F 13/352
2017/0346851 A1 * 11/2017 Drake ................... H04L 9/0838
2018/0028906 A1 * 2/2018 Tang ................... G06F 3/04842
2018/0028918 A1 * 2/2018 Tang ..................... G06F 3/0484
2018/0043260 A1 * 2/2018 Tang ..................... A63F 13/822
2018/0221770 A1 * 8/2018 Morishita ............... A63F 13/58
2018/0268775 A1 * 9/2018 Horneff ................. A63F 13/533
2019/0070493 A1 * 3/2019 He ........................ A63F 13/426
2019/0070494 A1 * 3/2019 He .......................... H04M 1/00
2019/0272707 A1 * 9/2019 Washington .......... A63F 13/837
2025/0222357 A1 * 7/2025 Shao ....................... A63F 13/58
2026/0034449 A1 * 2/2026 Hu .......................... A63F 13/55

FOREIGN PATENT DOCUMENTS

CN 113082712 A 7/2021
CN 113680055 A 11/2021
CN 113797544 A 12/2021
JP 2013158456 A 8/2013

* cited by examiner

First-person display interface 301

Third-person display interface 303

VIRTUAL CHARACTER TRACING METHOD AND APPARATUS, STORAGE MEDIUM, DEVICE, AND PROGRAM PRODUCT

CROSS-REFERENCE TO RELATED APPLICATIONS

This application is a continuation application of PCT Patent Application No. PCT/CN2023/082978, entitled "VIRTUAL CHARACTER TRACING METHOD AND APPARATUS, STORAGE MEDIUM, DEVICE, AND PROGRAM PRODUCT" filed on Mar. 22, 2023, which claims priority to Chinese Patent Application No. 202210577499.7, entitled "VIRTUAL CHARACTER TRACING METHOD AND APPARATUS, STORAGE MEDIUM, AND ELECTRONIC DEVICE" filed with the China National Intellectual Property Administration on May 25, 2022, both of which are incorporated by reference in their entirety.

FIELD OF THE TECHNOLOGY

This application relates to the field of computers, and specifically, to virtual character tracing.

BACKGROUND OF THE DISCLOSURE

Currently, in a game application, all enemies are generally displayed on a mini-map picture by full-image scanning. However, because of short full-image scanning time, some special enemies cannot be quickly screened, resulting in the inability to scan specific enemies.

In addition, in the game application, a virtual character generally moves constantly, adjusts own position to complete a game. If an enemy cannot be quickly defeated, the enemy moves and hides after being injured. In this case, if a player controls a virtual character and expects to trace the enemy further, a movement trajectory of the enemy cannot be learned, resulting in a technical problem of low efficiency in tracing a virtual character in the game application.

For the foregoing problem, no effective solution has been provided yet.

SUMMARY

Embodiments of this application provide a virtual character tracing method and apparatus, a storage medium, a device, and a program product, to resolve at least a technical problem of low efficiency in tracing a virtual character in the related art.

According to an aspect of embodiments of this application, a virtual character tracing method is performed by an electronic device, the method including: displaying a virtual scene and a mini-map picture, the virtual scene including a first virtual character; in response to a target trigger operation, controlling the first virtual character to launch a first virtual attack item at a second virtual character in a different camp from the first virtual character; and displaying a movement of a position of the second virtual character in the mini-map picture after the second virtual character is hit by the first virtual attack item.

According to still another aspect of embodiments of this application, a non-transitory computer-readable storage medium is further provided, having a computer program stored thereon, the computer program, when being run by a processor of an electronic device, causing the electronic device to perform the foregoing virtual character tracing method.

According to still another aspect of embodiments of this application, an electronic device is further provided, including a memory and a processor, the memory having a computer program stored therein, and computer program, when executed by the processor, causing the electronic device to perform the foregoing virtual character tracing method by using the computer program.

In embodiments of this application, a virtual scene in which a first virtual character is located and a mini-map picture are displayed in a target application. The first virtual character is controlled, in response to a target trigger operation, to launch a first virtual attack item. The first virtual attack item is configured for triggering, when a virtual character in a different camp from the first virtual character is hit, tracing of the hit virtual character. A position of a second virtual character is displayed in the mini-map picture when the second virtual character in a different camp from the first virtual character is hit by the first virtual attack item. A moved position of the second virtual character is displayed in the mini-map picture when the position of the second virtual character moves during tracing of the second virtual character. The first virtual attack item is controlled to hit the second virtual character, so that the position of the second virtual character can be continuously displayed on the mini-map picture. When the second virtual character moves, the position of the second virtual character is dynamically updated in the mini-map picture, so that continuous tracing for a specific target can be implemented, thereby improving efficiency of tracing a virtual character, optimizing a technical effect of a virtual attack item in tracing a target, and further resolving a technical problem of low efficiency in tracking a virtual character in the related art.

In addition, an identity identification is displayed in the mini-map picture, to enable a player to clearly learn an identity of a currently traced virtual character. Different identification combinations are displayed to trace a specific virtual character in a targeted manner. It is convenient for the player to notify another player in the same camp as the player. For another player, because the identification combination may indicate a virtual character initiating tracing, when the virtual character initiating the tracing performs a prompt operation, content information prompted by the prompt operation can be determined quickly, further improving tracing efficiency of the player in a game application, and enriching an interactive need of the player.

DESCRIPTION OF EMBODIMENTS

To make a person skilled in the art better understand the solutions of this application, the following clearly and completely describes the technical solutions in embodiments of this application with reference to the accompanying drawings in embodiments of this application. Apparently, the described embodiments are merely some of embodiments of this application rather than all of embodiments. All other embodiments obtained by a person of ordinary skill in the art based on embodiments of this application without creative efforts shall fall within the protection scope of this application.

In this specification, claims, and accompanying drawings of this application, the terms "first", "second", and the like are intended to distinguish similar objects but do not necessarily indicate a specific order or sequence. Such used data is interchangeable where appropriate, so that embodiments of this application described here can be implemented in an order other than those illustrated or described here. Moreover, the terms "include", "have", and any other variants are intended to cover the non-exclusive inclusion, for example, a process, method, system, product, or device that includes a list of operations or units is not necessarily limited to those expressly listed operations or units, but may include other steps or units not expressly listed or inherent to such a process, method, system, product, or device.

First, some terms used in the description of embodiments of this application are explained below.

Shooting game: It is a game that includes, but is not limited to, all games using firearm for remote attacks, such as a first-person shooting game, and a third-person shooting game.

First-person shooting game (FPS): It is a game that belongs to a branch of an action game (ACT). As the name implies, the first-person shooting game is a shooting game with a subjective perspective of a player.

Third-person shooting game (TPS): It is also a type of a shooting game. A difference with first-person shooting game is that the player is visible on a game screen.

This application is described below with reference to embodiments.

Figure 1:
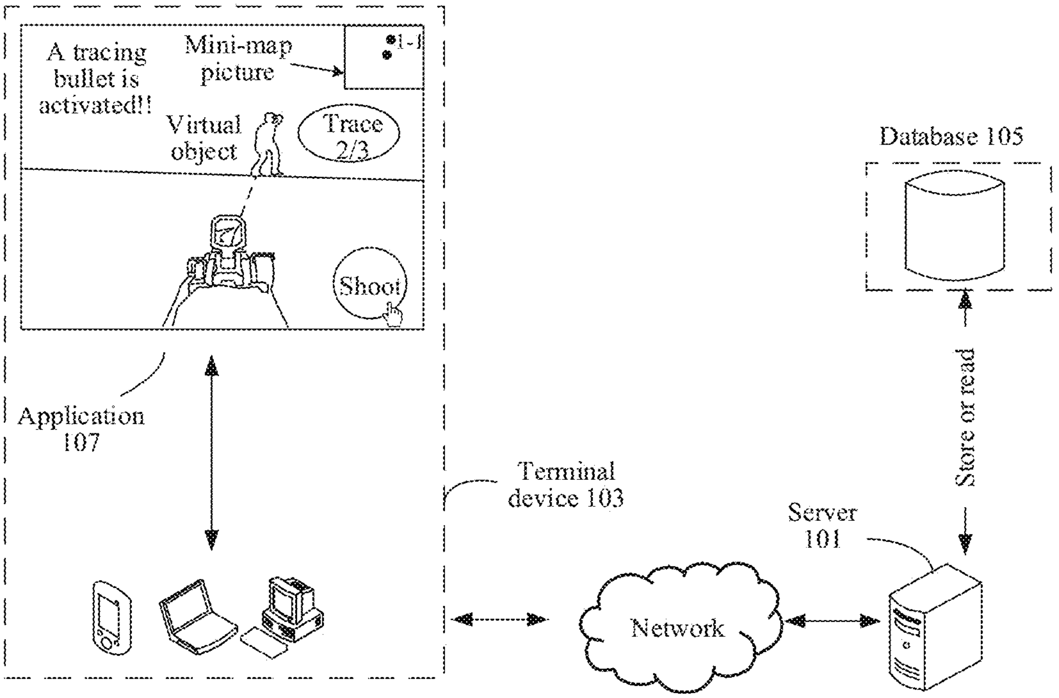
FIG. 1 is a schematic diagram of an application environment of an exemplary virtual character tracing method according to an embodiment of this application.

According to an aspect of embodiments of the present disclosure, a virtual character tracing method is provided. In this embodiment, the foregoing virtual character tracing method may be applied to a hardware environment shown in FIG. 1 that includes a server 101, a network 102, and a terminal device 103. As shown in FIG. 1, the server 101 is connected to the terminal device 103 over the network. The server may be, but is not limited to, configured to provide a service to the terminal device or a client installed on the terminal device. The client may include a video client, an instant messaging client, a browser client, a game client, and the like. The foregoing server 101 may be, but is not limited to, configured with a database 105 for providing a data storage service for the server 101. In addition, the foregoing network may include, but is not limited to, a wired network and a wireless network. The wired network includes a local area network, a metropolitan area network, and a wide area network. The wireless network includes Bluetooth, WIFI, and another network for wireless communication. The terminal device 103 may be a terminal configured with a client of a target game application, and may include, but is not limited to, at least one of the following: a mobile phone (such as an Android phone and an iOS phone), a notebook computer, a tablet computer, a palmtop computer, a mobile Internet device (MID), a desktop computer, a smart television, and the like. The server 101 may be a single server, or a server cluster including a plurality of servers, or a cloud server. An application 107 that provides the foregoing virtual character tracing service may be, but is not limited to, displayed by the terminal device 103. The foregoing virtual character tracing service may be used by using an entrance of the application 107 configured on the terminal for virtual character tracing. For example, the virtual character tracing method may be used based on the application 107. Information such as the foregoing virtual character and an interface for controlling the foregoing virtual attack item to trace the virtual character may be displayed via a display interface of the application 107. The foregoing description is only an example. This is not limited in this embodiment.

With reference to FIG. 1, the foregoing virtual character tracing method may be implemented on the terminal device 103 by using the following operations:

S1: Display, in a target application installed on the terminal device 103, a virtual scene in which a first virtual character is located and a mini-map picture.

S2: Control, in response to a target trigger operation, the first virtual character to launch a first virtual attack item on the terminal device 103. The first virtual attack item is configured for triggering, when a virtual character in a different camp from the first virtual character is hit, tracing of the hit virtual character.

S3: Display a position of a second virtual character in the mini-map picture on the terminal device 103 when the second virtual character in a different camp from the first virtual character is hit by the first virtual attack item.

S4: Display a moved position of the second virtual character in the mini-map picture on the terminal device 103 when the position of the second virtual character moves.

In this embodiment, the foregoing virtual character tracing method may alternatively be implemented by a server, for example, the server 101 shown in FIG. 1, or by the terminal device and the server.

The foregoing description is only an example. This is not specifically limited in this embodiment.

Figure 2:
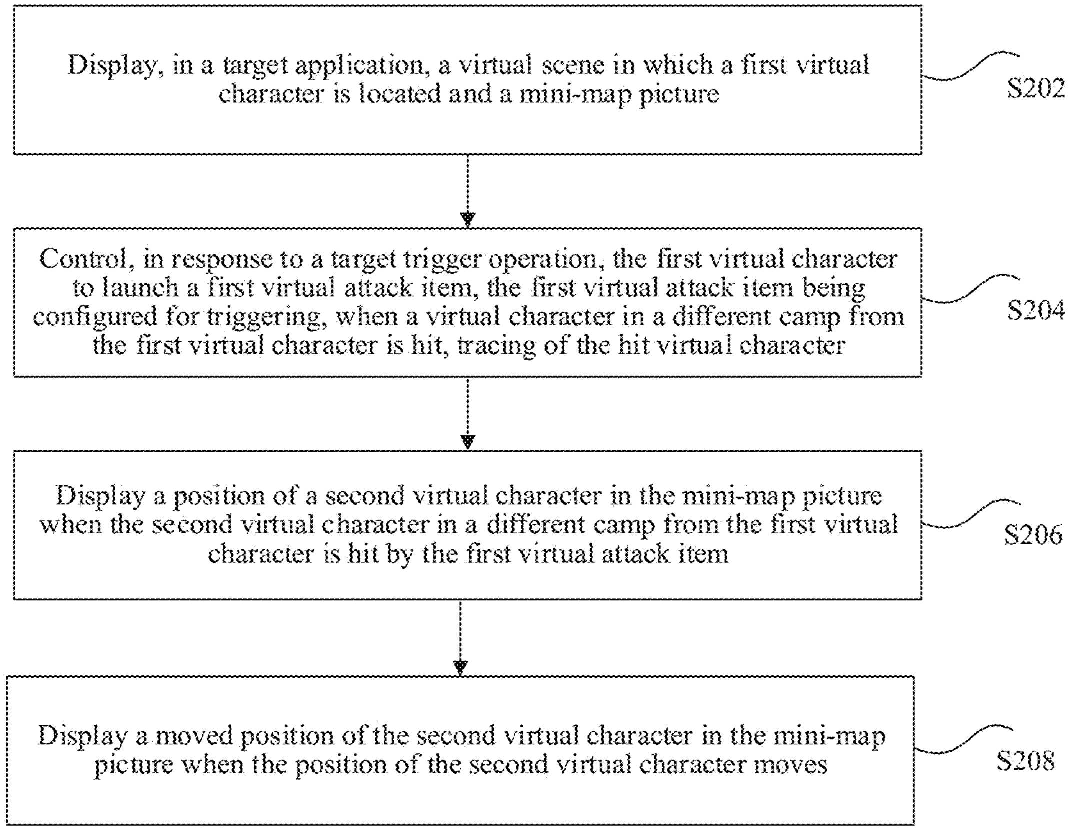
FIG. 2 is a flowchart of an exemplary virtual character tracing method according to an embodiment of this application.

In some embodiments, as shown in FIG. 2, the foregoing virtual character tracing method includes:

S202: Display, in a target application, a virtual scene in which a first virtual character is located and a mini-map picture.

S204: Control, in response to a target trigger operation, the first virtual character to launch a first virtual attack item. The first virtual attack item is configured for triggering, when a virtual character in a different camp from the first virtual character is hit, tracing of the hit virtual character.

S206: Display a position of a second virtual character in the mini-map picture when the second virtual character in a different camp from the first virtual character is hit by the first virtual attack item.

S208: Display a moved position of the second virtual character in the mini-map picture when the position of the second virtual character moves.

Figure 3:
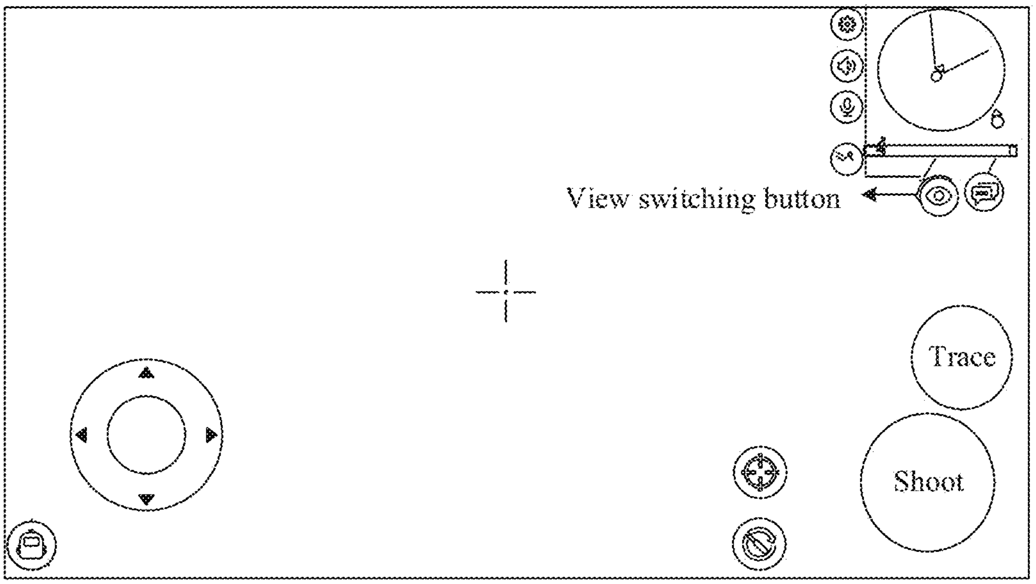
FIG. 3 is a schematic diagram of an exemplary virtual character tracing method according to an embodiment of this application.
Figure 3:
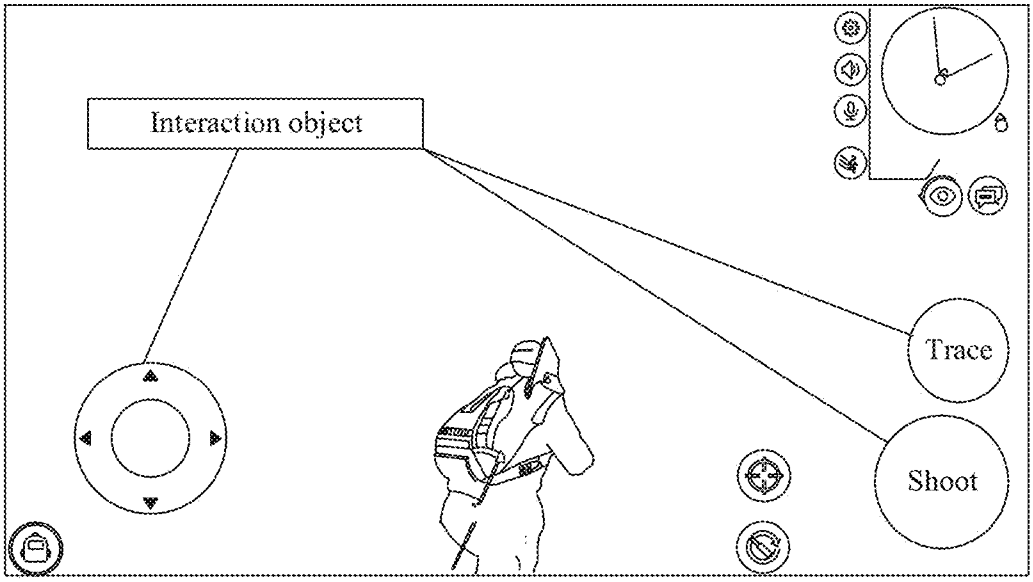

In this embodiment of this application, the foregoing virtual character tracing method may be, but is not limited to, applied to various applications. An example in which the target application is a target game application is used. The target game application may be a multilayer online battle arena (short for MOBA) game or a single-player game (short for SPG). This is not specifically limited herein. The target game application may include, but is not limited to, a shooting application, a role-playing application, a real-time strategy application, and the like. The shooting application may include, but is not limited to, a first-person shooting application, a third-person shooting application, and a shooting application capable of switching between a first person and a third person. FIG. 3 is a schematic diagram of a virtual character tracing method according to an embodiment of the present disclosure. As shown in FIG. 3, an application display interface may be divided into a first-person display interface 301 and a third-person display interface 303, and include, but is not limited to, a display interface that uses a view-switching interaction button to switch between a first person and a third person.

The foregoing target application may include, but is not limited to, at least one of the following: a two-dimensional (2D) game application, a three-dimensional (3D) game application, a virtual reality (VR) game application, an augmented reality (AR) game application, and a mixed reality (MR) game application. The foregoing description is only an example. This is not limited in this embodiment.

For example, currently, in the related art, all virtual characters in a virtual scene are generally displayed on a mini-map picture after a first virtual object uses a virtual skill, and a position of a virtual object is marked in the mini-map picture with a red dot. However, in this embodiment, after a target trigger operation is obtained, the first virtual character is controlled to launch a first virtual attack item to a second virtual character. A position of the second virtual character is displayed in the mini-map picture when the second virtual character in a different camp from the first virtual character is hit by the first virtual attack item. In addition, a moved position of the second virtual character is further displayed in the mini-map picture when the position of the second virtual character moves during tracing of the second virtual character. This can improve efficiency of tracing a virtual character, optimize a technical effect of a virtual attack item in tracing a target, and further resolve a technical problem of low efficiency in tracking a virtual character in the related art.

In this embodiment of this application, a virtual scene corresponding to the foregoing first virtual character may include, but is not limited to, a game picture displayed on a terminal of a game application to which a player controlling the first virtual character logs in. The foregoing mini-map picture may include, but is not limited to, a thumbnail of the virtual scene. Taking the game application as an example, the foregoing mini-map picture may include, but is not limited to, a game thumbnail displayed in the game picture of the game application. The foregoing mini-map picture may include, but is not limited to, a panoramic map configured as a current game, and may further include, but is not limited to, a partial map centered on the first virtual character.

Figure 4:
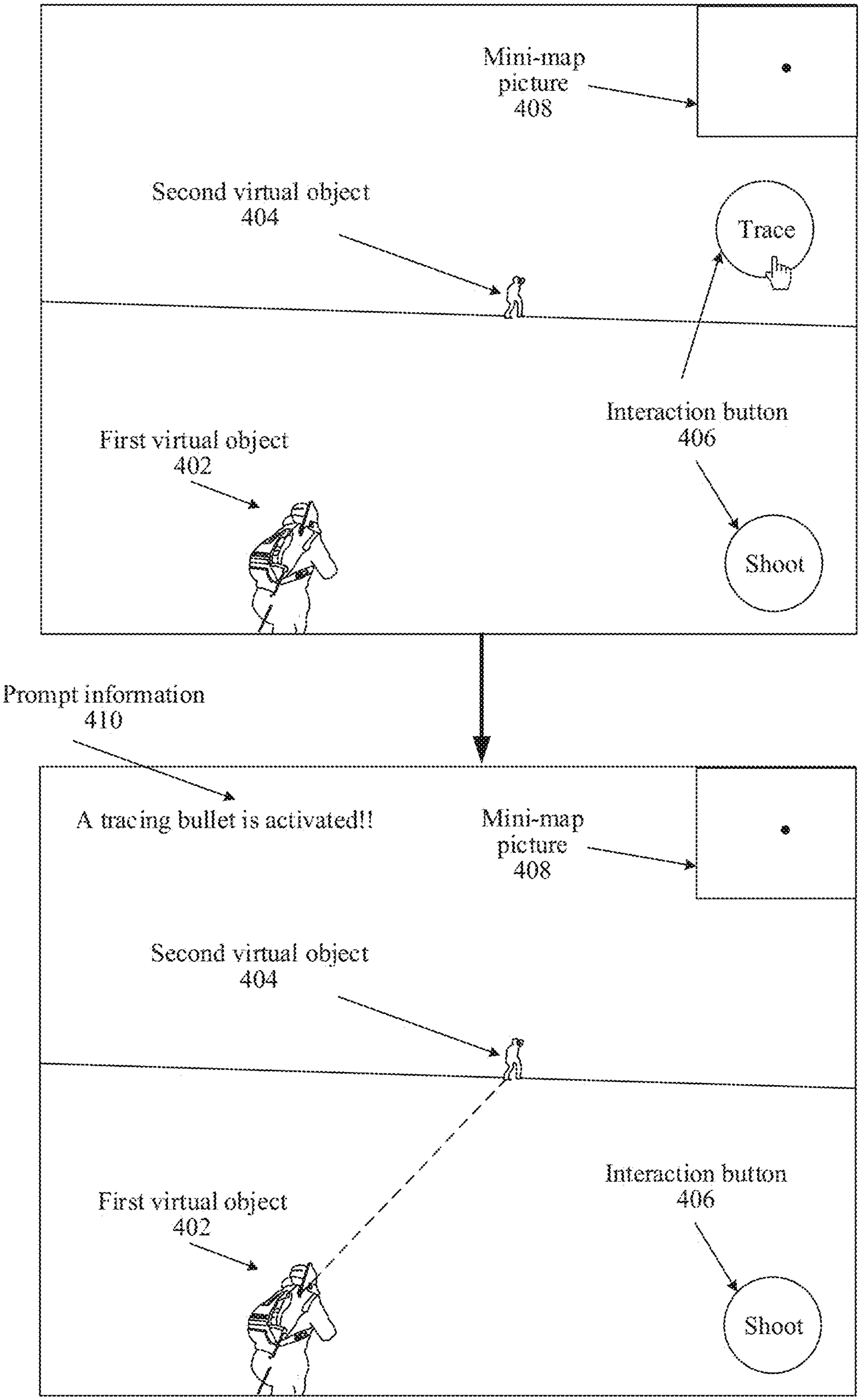
FIG. 4 is a schematic diagram of still another exemplary virtual character tracing method according to an embodiment of this application.

For example, FIG. 4 is a schematic diagram of another virtual character tracing method according to an embodiment of the present disclosure. As shown in FIG. 4, a first virtual object 402, a second virtual object 404, an interaction button 406, and a mini-map picture 408 are displayed on a game picture of a game application. When a player controls the first virtual object 402 to observe the second virtual object 404 in the game application, the player autonomously determines whether to trace the second virtual object. When it is necessary to trace, an interaction operation is performed on a "Trace" interaction button in the interaction button 406, and the foregoing first virtual object is configured with a first virtual attack item for tracing a hit virtual character.

When the first virtual attack item is activated, prompt information 410 may be displayed on the game picture to prompt that the first virtual object currently owns the first virtual attack item. When a virtual object is hit, the hit virtual object starts to be traced.

In this embodiment of this application, the foregoing target trigger operations may include, but are not limited to, a touch interaction operation, a voice control operation, and a trigger operation implemented in a manner of a preset time threshold or a preset virtual resource quantity threshold.

In this embodiment of this application, the foregoing first virtual attack item may include, but is not limited to, a virtual attack item capable of hitting the second virtual character after being launched, such as a virtual bullet, a virtual missile, and a virtual laser. The foregoing first virtual attack item is a virtual attack item pre-configured for the first virtual character, and may perform hitting after the target trigger operation is obtained.

In this embodiment of this application, the triggering the tracing of the hit virtual character may include, but is not limited to, displaying a specific position of the hit virtual character in the mini-map picture, and may further include, but is not limited to, displaying an area in which a position that the hit virtual character is located in the mini-map picture.

In this embodiment of this application, the displaying the position of the second virtual character in the mini-map picture may include, but is not limited to, displaying a preset position identification, for example, a circle, a triangle, or a rectangle to mark the position of the second virtual character on the mini-map picture, and may further include, but is not limited to, displaying an identification associated with the second virtual character, for example, a camp identification of the second virtual character, or a function identification of the second virtual character.

Figure 5:
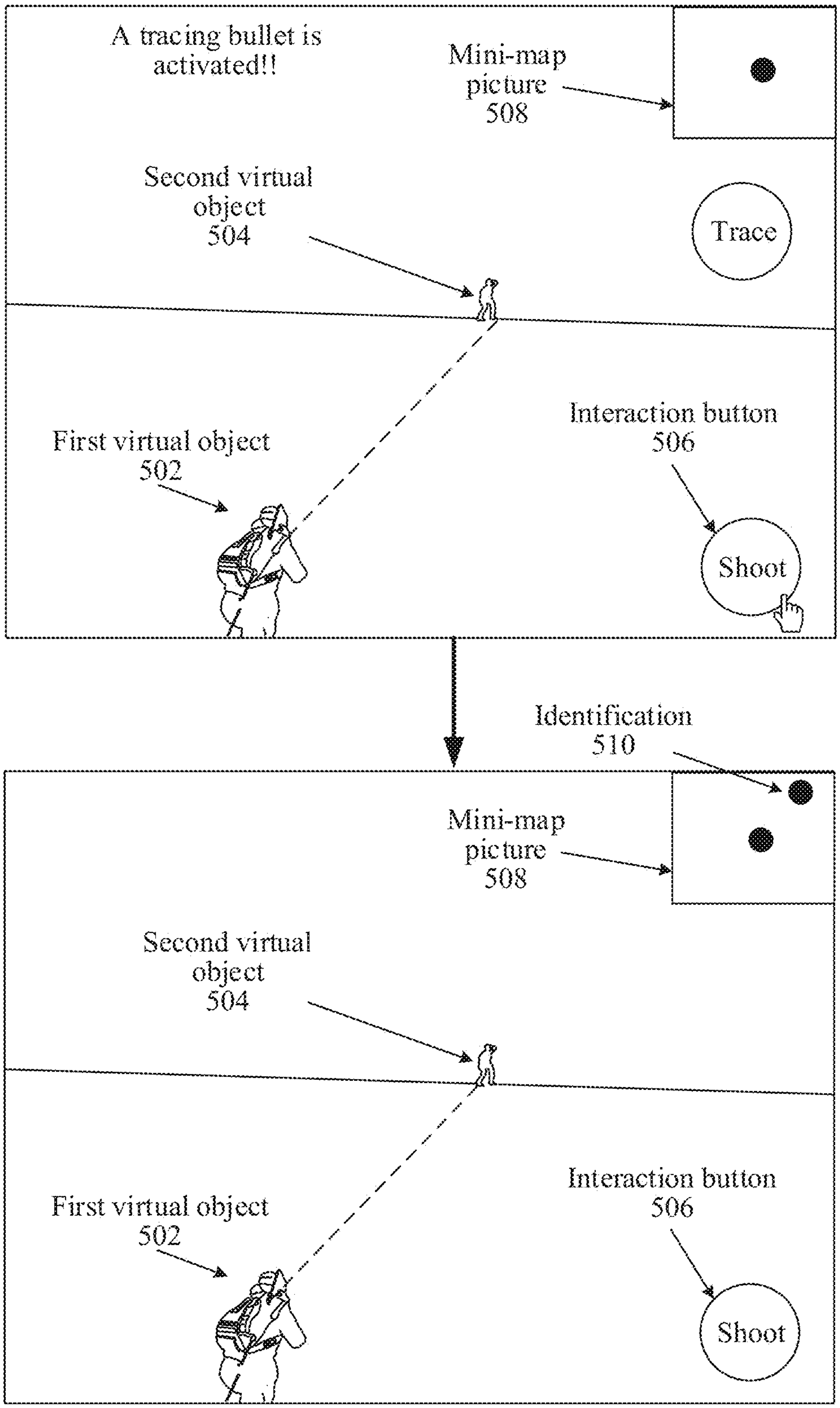
FIG. 5 is a schematic diagram of still another exemplary virtual character tracing method according to an embodiment of this application.

For example, FIG. 5 is a schematic diagram of another virtual character tracing method according to an embodiment of the present disclosure. As shown in FIG. 5, a first virtual object 502, a second virtual object 504, an interaction button 506, a mini-map picture 508, and an identification 510 are included. A player controls, when prompt information "A tracing bullet is activated!!" is displayed, the first virtual object 502 to perform an interaction operation (corresponding to the foregoing target trigger operation) on the interaction button 506, to control the first virtual object to launch a first virtual attack item to the second virtual object 504. The identification 510 is displayed in the mini-map picture 508 when the second virtual character 504 is hit by the first virtual attack item. The identification 510 represents a position at which the second virtual character 504 is located.

The voice control operation may include, but is not limited to, when a voice control command representing starting tracing is received, the first virtual object is triggered to launch the first virtual attack item to the second virtual object. The triggering in a manner of a preset time threshold may include, but is not limited to, presetting countdown, and when the countdown ends, the first virtual object is triggered to launch the first virtual attack item to the second virtual object. The triggering in a manner of a preset virtual resource quantity threshold may include, but is not limited to, when a quantity of virtual resources of the first virtual character satisfies a preset threshold, the first virtual object is triggered and controlled to launch the first virtual attack item to the second virtual object. The foregoing virtual resources may include, but are not limited to, virtual energy, virtual gold coins, a quantity of killed virtual characters, and the like.

In this embodiment of this application, the foregoing different camps may include, but are not limited to, a group preset before a current game is entered, and a group performed in a manner of a preset grouping operation during playing of the current game. The group here is configured for indicating camps to which a plurality of virtual objects participating in a same game task belong, and the virtual objects in different camps may be attacked against each other. Specifically, the virtual objects in different camps may be configured to oppose each other.

In this embodiment of this application, the tracing of the second virtual character may be understood as maintaining a tracing effect of the second virtual character for preset duration when the second virtual character is hit by the first virtual attack item. In this case, when the position of the second virtual character moves, the moved position of the second virtual character is displayed in the mini-map picture.

Displaying the moved position of the second virtual character in the mini-map picture may include, but is not limited to, being understood as continuously displaying the moved position of the second virtual character during movement of the second virtual character, and alternatively being understood as re-displaying the moved position of the second virtual character when the second virtual character stays longer than a preset value during the movement of the second virtual character.

Figure 6:
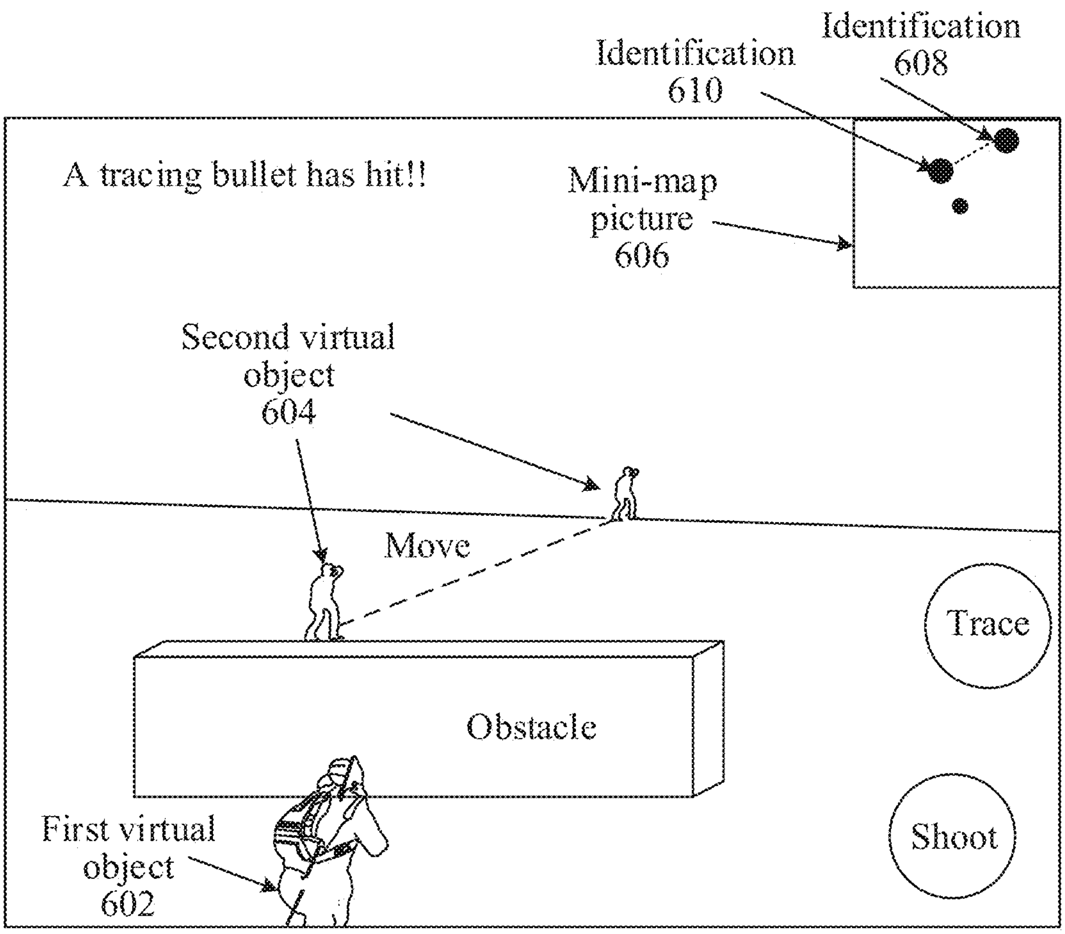
FIG. 6 is a schematic diagram of still another exemplary virtual character tracing method according to an embodiment of this application.

For example, FIG. 6 is a schematic diagram of another virtual character tracing method according to an embodiment of the present disclosure. As shown in FIG. 6, a first virtual object 602, a second virtual object 604, a mini-map picture 606, an identification 608, and an identification 610 are included. A player controls the first virtual object 602, and when prompt information "A tracing bullet has hit!!" is displayed, the first virtual object 602 controls the first virtual attack item to hit the second virtual object 604. The second virtual object 604 moves to lower left during tracing of the second virtual object 604. In this case, a movement trajectory corresponding to movement of the second virtual object 604 to the lower left is displayed in the mini-map picture. In other words, the identification 608 moves to the lower left in the mini-map picture to the identification 610.

This may include, but is not limited to, continuously displaying the movement trajectory of the second virtual object 604. In other words, it is determined whether the identification 608 follows real-time movement based on whether the second virtual object 604 moves. This may further include, but is not limited to, intermittently displaying a position of the second virtual object 604. In other words, the identification 608 cancels the display when the second virtual object 604 moves, and re-displays a moved position identification when the second virtual object 604 stops moving again.

In addition, the foregoing virtual character tracing method may include, but is not limited to, displaying the position of the second virtual object on the mini-map picture when the second virtual object does not appear within a field of view of the first virtual object after the second virtual object is hit by the first virtual object. The foregoing non-appearance of the second virtual object within the field of view of the first virtual object may include, but is not limited to, an obstacle between the first virtual object and the second virtual object shown in FIG. 6, the foregoing first virtual object and the second virtual object are in different virtual space, or the like.

The foregoing description is only an example. This is not specifically limited in this embodiment of this application.

Figure 7:
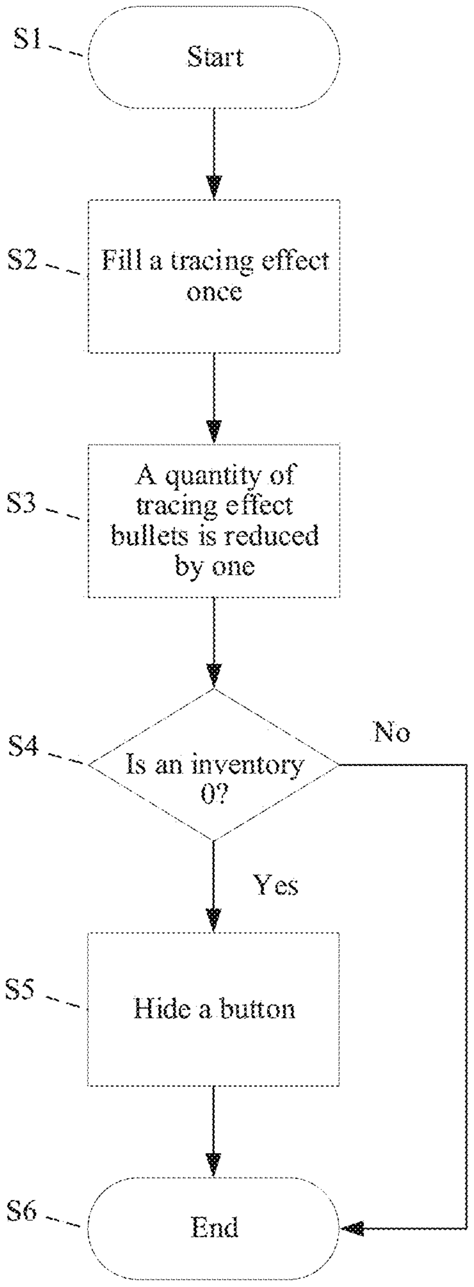
FIG. 7 is a schematic diagram of still another exemplary virtual character tracing method according to an embodiment of this application.

FIG. 7 is a flowchart of another virtual character tracing method according to an embodiment of the present disclosure. As shown in FIG. 7, the method may include, but is not limited, the following operations.

S1: Start.

S2: Fill a tracing effect once.

A first virtual character is filled with a tracing effect bullet once. A virtual tracing button is displayed, and a first virtual attack item (the tracing effect bullet) is generated by adding the tracing effect to a current virtual bullet after a player clicks/taps the virtual tracing button.

S3: A quantity of tracing effect bullets is reduced by one.

After the first virtual attack item is controlled to be launched, the quantity of tracing effect bullets is reduced by one.

S4: Is an inventory 0?

It is determined whether a quantity of current tracing effect bullets is 0. When a determining result is no, operation S6 is directly performed.

S5: Hide the button.

When the determining result of operation S4 is yes, a virtual tracing button for configuring the first virtual attack item is hided.

S6: End.

Figure 8:
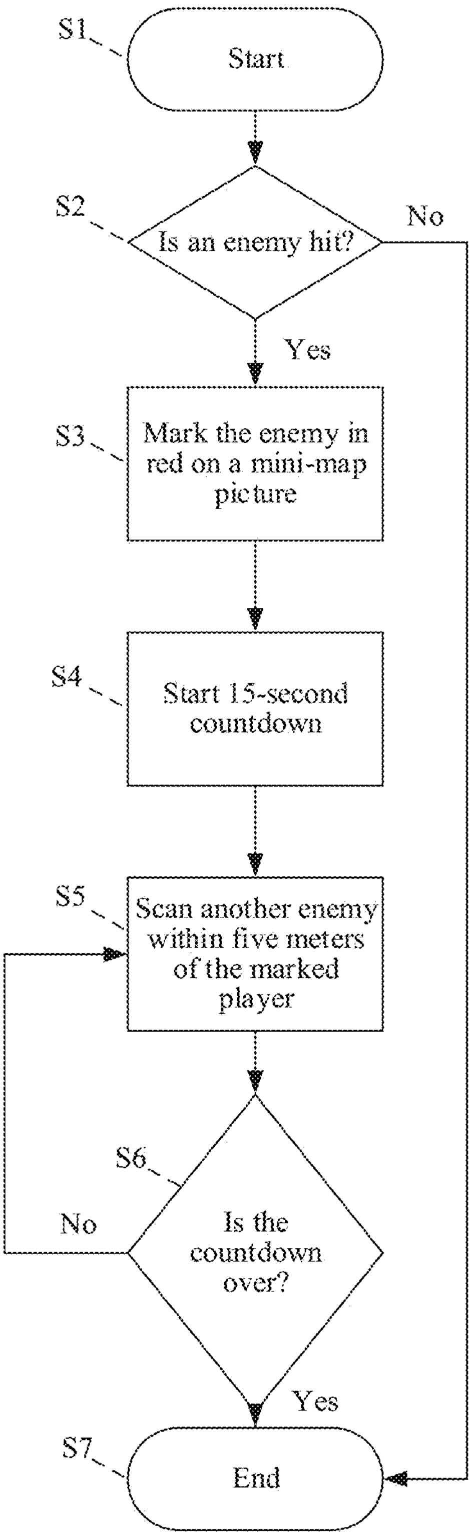
FIG. 8 is a schematic diagram of still another exemplary virtual character tracing method according to an embodiment of this application.

For example, FIG. 8 is a flowchart of still another virtual character tracing method according to an embodiment of the present disclosure. As shown in FIG. 8, the method may include, but is not limited, the following operations.

S1: Start.

S2: Is an enemy hit?

It is detected whether the enemy (corresponding to the foregoing second virtual object) is really hit by the tracing effect bullet.

S3: Mark the enemy in red on the mini-map picture.

In a case that a detecting result is yes, the enemy is marked on the mini-map picture.

S4: Start 15-second countdown.

S5: Scan another enemy within five meters of the marked player.

S6: Is the countdown over?

It is determined whether the countdown is over. When the countdown is not over, S5 is continued to be performed to scan another enemy within five meters of the marked player. When the enemy is missed or the countdown is over, S7 is performed.

S7: End.

The player may add a tracing mark to own virtual bullet. After the enemy is hit by the tracing effect bullet, the enemy may be injured. In addition, the enemy and whether there is a virtual character in the same camp as the enemy a few meters away from the player may be continuously displayed for a short period, to trace a specific enemy player in a targeted manner, thereby improving combat efficiency of the player and efficiency of obtaining positions of players in different camps.

The foregoing description is only an example. This is not specifically limited in this embodiment of this application.

According to this embodiment, a virtual scene in which a first virtual character is located and a mini-map picture are displayed in a target application. The first virtual character is controlled, in response to a target trigger operation, to launch a first virtual attack item. The first virtual attack item is configured for triggering, when a virtual character in a different camp from the first virtual character is hit, tracing of the hit virtual character. A position of a second virtual character is displayed in the mini-map picture when the second virtual character in a different camp from the first virtual character is hit by the first virtual attack item. A moved position of the second virtual character is displayed in the mini-map picture when the position of the second virtual character moves during tracing of the second virtual character. The first virtual attack item is controlled to hit the second virtual character, so that the position of the second virtual character can be continuously displayed on the mini-map picture. When the second virtual character moves, the second virtual character is still kept displaying, so that continuous tracing for a specific target can be implemented, thereby improving efficiency of tracing a virtual character, optimizing a technical effect of a virtual attack item in tracing a target, and further resolving a technical problem of low efficiency in tracking a virtual character in the related art.

In some embodiments, the foregoing method further includes:

determining target identity information of the second virtual character when the second virtual character is hit by the first virtual attack item, the target identity information being configured for indicating identity information corresponding to the second virtual character in the virtual scene; and adding a target identity identification for the second virtual character based on the target identity information, and displaying the target identity identification in the mini-map picture, the target identity identification being configured for representing a position of the second virtual character in the virtual scene.

In this embodiment of this application, the foregoing target identity information represents corresponding identity information of the second virtual character in a current virtual scene, for example, camp information to which the second virtual character belongs, and information of a virtual hit point of the second virtual character. The foregoing target identity identification may include, but is not limited to, an identification indicating a camp to which the second virtual character belongs, may further include, but is not limited to, an identification indicating a virtual military branch of the second virtual character, and may further include, but is not limited to, an identity identification indicating a current state of the second virtual character. For example, a green identity identification is displayed when the virtual hit point of the second virtual character is 80% or more. A yellow identity identification is displayed when the virtual hit point of the second virtual character is between 30% and 80%. A red identity identification is displayed when the virtual hit point of the second virtual character is between 0 and 30%. The virtual hit point of the second virtual character is identified by different colors to facilitate the player to decide whether to trace the second virtual character.

In some embodiments, the foregoing method further includes:

determining a number of current launches of the first virtual attack item when a total number of times the first virtual attack item is allowed to be launched is a preset number of times, and the second virtual character is hit by the first virtual attack item, the number of current launches being a number of launches determined after the first virtual attack item hits the second virtual character, and the number of current launches being less than or equal to the preset number of times; and displaying, based on the number of current launches, a first target identification combination at the position at which the second virtual character is located in the mini-map picture, the first target identification combination being configured for representing a number of times the first virtual attack item hits, when the second virtual character is hit by the first virtual attack item, a virtual character.

In this embodiment of this application, a total number of times the first virtual attack item is allowed to launch may be preset by a system, and may be configured to be associated with a virtual attribute of the first virtual character. For example, the first virtual character may be configured with a corresponding energy slot. When energy stored in the energy slot increases by 10%, the number of launches of the first virtual attack item is increased once. The energy may be obtained by defeating other virtual characters in different camps.

In this embodiment of this application, the determining the number of current launches of the first virtual attack item may include, but is not limited to, determining the number of launches the first virtual attack item is launched in a current game, and may further include, but is not limited to, associating the first virtual attack item with a virtual skill, and the number of launches the first virtual attack item is launched during use of the virtual skill.

In some embodiments, the foregoing method further includes:

determining a number of current hits of the first virtual attack item when the second virtual character is hit by the first virtual attack item, the number of current hits being a number of times the first virtual attack item currently hits a virtual character; and displaying, based on the number of current hits, a second target identification combination at the position at which the second virtual character is located in the mini-map picture, the second target identification combination being configured for representing a number of times the first virtual attack item hits, after the second virtual character is hit by the first virtual attack item, a virtual character.

Figure 9:
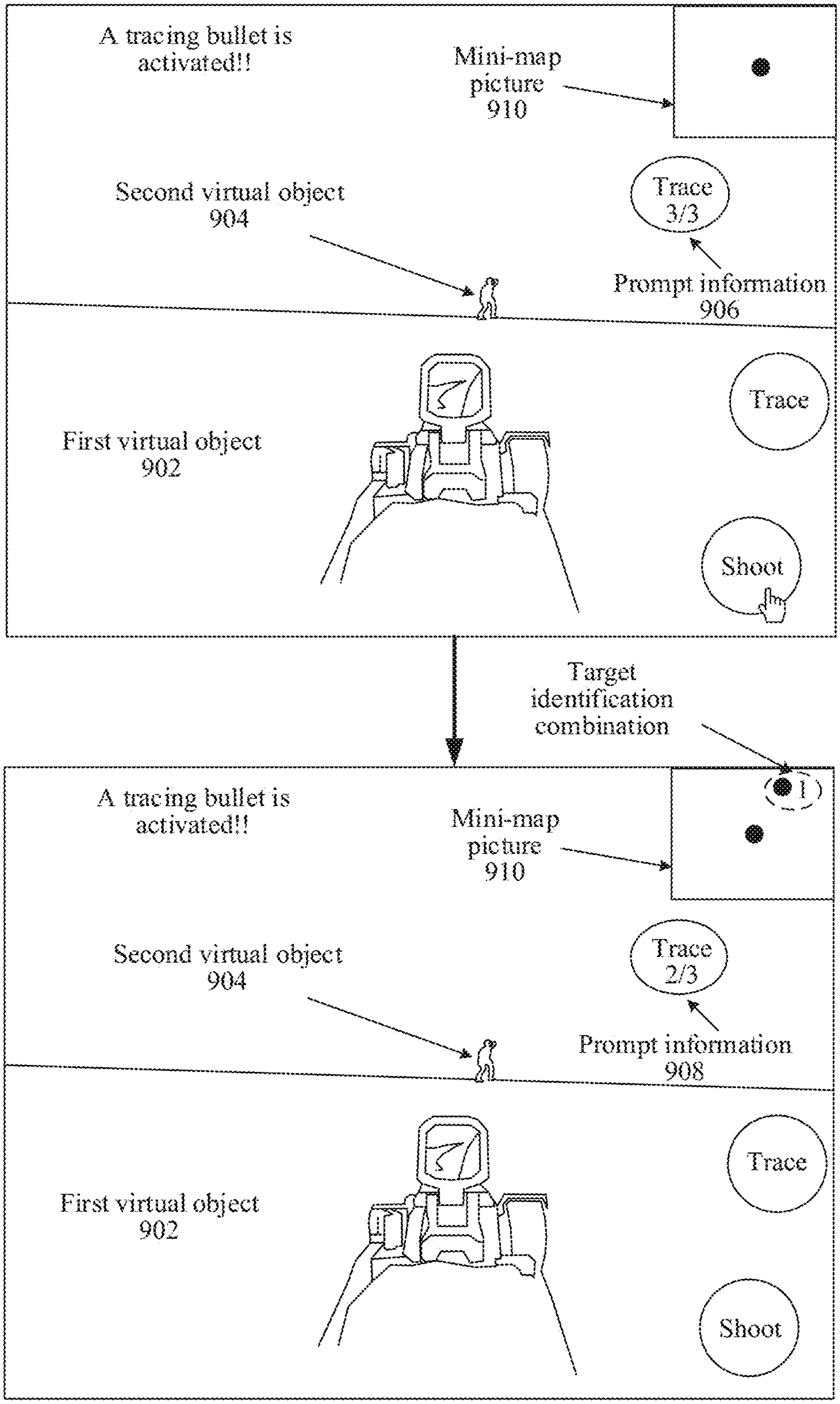
FIG. 9 is a schematic diagram of still another exemplary virtual character tracing method according to an embodiment of this application.

For example, FIG. 9 is a schematic diagram of still another virtual character tracing method according to an embodiment of the present disclosure. As shown in FIG. 9, a first virtual object 902, a second virtual object 904, prompt information 906, prompt information 908, and a mini-map picture 910 are included. When the first virtual object 902 is equipped with the foregoing first virtual attack item, the prompt information 906 is displayed in a game picture. In this case, the position identification of the second virtual object is not displayed in the mini-map picture 910. When the player controls the first virtual character to perform a shooting operation, the prompt information 908 is displayed in the game picture. In this case, the position identification of the second virtual object is displayed in the mini-map picture 910. The prompt information 906 and the prompt information 908 are both configured for prompting the number of times the current first virtual attack item is allowed to launch or the number of times the current first virtual attack item hits a virtual object.

According to this embodiment, an order in which the second virtual character is hit may be marked in the mini-map picture. This is easy for the player controlling the first virtual character to notify another player, improving tracing efficiency, and optimizing use experience of a player.

In some embodiments, the foregoing method further includes:

displaying a first identification combination when the number of current hits represents that the second virtual character is a virtual object first hit by the first virtual attack item, the first identification combination including a first sub-identification and a second sub-identification, the first sub-identification being configured for identifying an identity of the first virtual character, and the second sub-identification representing that the second virtual character is a virtual character first hit by the first virtual attack item; and displaying a second identification combination when the number of current hits represents that the second virtual character is not the virtual object first hit by the first virtual attack item, the second identification combination including the first sub-identification and a third sub-identification, and the third sub-identification being configured for representing a number of times the first virtual attack item hits, when the second virtual character is hit by the first virtual attack item, a virtual character.

In this embodiment of this application, the foregoing number of current hits indicates that the first virtual attack item first hits the virtual object, and specifically, may include, but is not limited to, that the first virtual attack item hits a virtual object after the first launch, or that the first virtual attack item first hits a virtual character in a different camp from the first virtual character.

In this embodiment of this application, the foregoing first identification combination includes the first sub-identification and the second sub-identification. The first sub-identification may include, but is not limited to, an ID of the first virtual character, a serial number of the first virtual character, and the like. The serial number of the first virtual character may include, but is not limited to, a serial number uniquely identifying the first virtual character in a camp in which the first virtual character is located. The foregoing second sub-identification is configured for representing that the second virtual character is the virtual character first hit by the first virtual attack item, and may further include, but is not limited to, representing that the second virtual character is a virtual character first hit, when the first virtual attack item is first launched, by the first virtual attack item.

In this embodiment of this application, the foregoing second identification combination includes the first sub-identification and the third sub-identification. The first sub-identification may include, but is not limited to, an ID of the first virtual character, a serial number of the first virtual character, and the like. The serial number of the first virtual character may include, but is not limited to, a serial number uniquely identifying the first virtual character in a camp in which the first virtual character is located. The foregoing third sub-identification is configured for representing that the first virtual character controls the number of times the first virtual attack item hits, when the second virtual character is hit, the virtual character.

Figure 10:
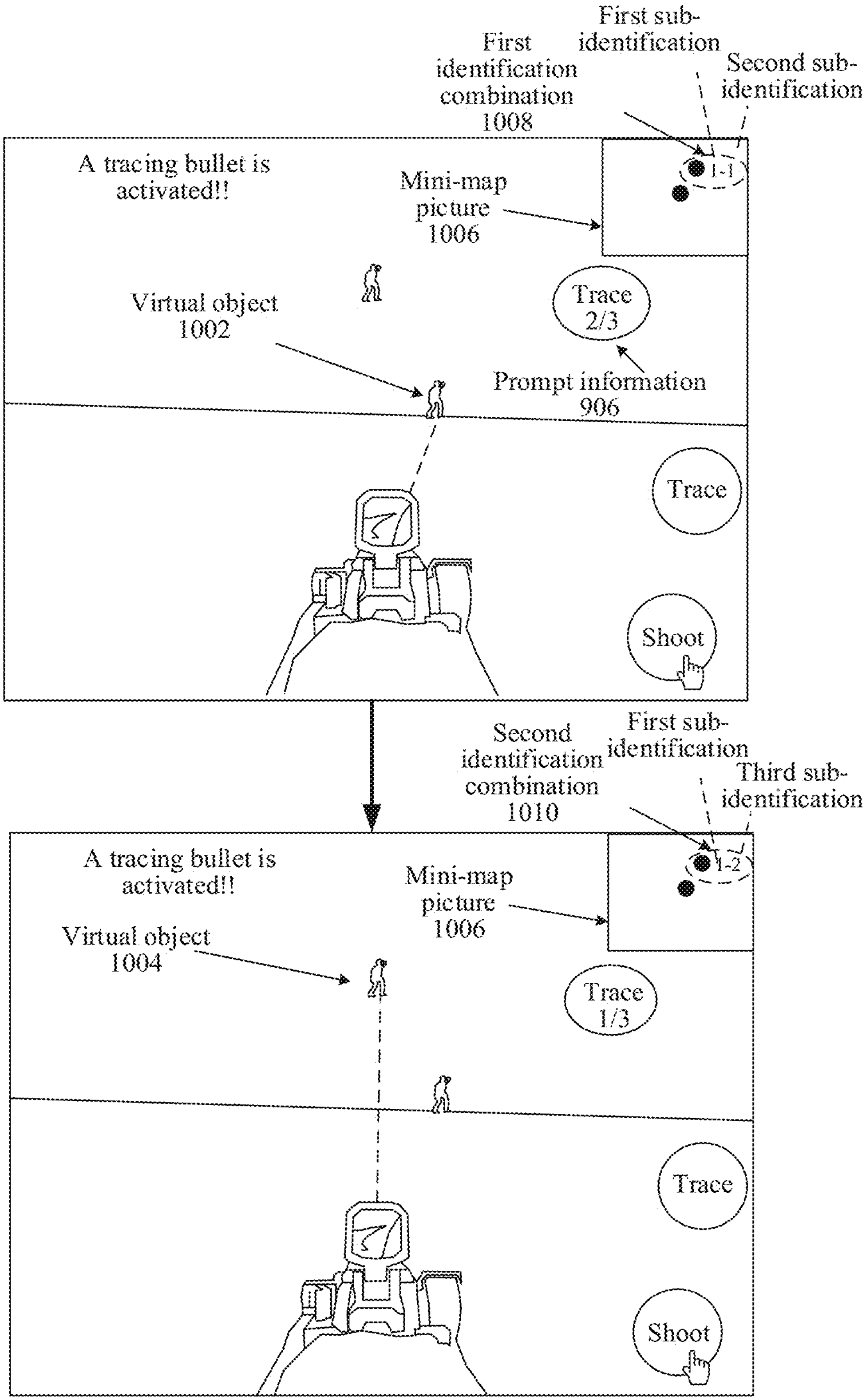
FIG. 10 is a schematic diagram of still another exemplary virtual character tracing method according to an embodiment of this application.

For example, FIG. 10 is a schematic diagram of still another virtual character tracing method according to an embodiment of the present disclosure. As shown in FIG. 10, a virtual object 1002, a virtual object 1004, a mini-map picture 1006, a first identification combination 1008, and a second identification combination 1010 are included. In a case that the virtual object 1002 is first hit by the first virtual character, the first identification combination 1008 including the first sub-identification and the second sub-identification is displayed on the mini-map picture 1006. In a case that the first virtual character launches again and hits the virtual object 1004, a second identification combination 1010 including the first sub-identification and the third sub-identification is displayed on the mini-map picture 1006. The third sub-identification represents a second hit to the virtual object.

The foregoing description is only an example. This is not specifically limited in this embodiment.

According to this embodiment, the first identification combination or the second identification combination may be displayed in the mini-map picture. In addition, when the second virtual character is hit, it is marked in the mini-map picture how many times the first virtual attack item hits the virtual character. This is easy for the player controlling the first virtual character to notify another player, improving tracing efficiency, and optimizing use experience of a player.

In some embodiments, the foregoing method further includes:

displaying, when the first identification combination is displayed, the first sub-identification as a number identification, and displaying the second sub-identification as a fixed identification, the number identification being configured for representing the first virtual character launching the first virtual attack item, and the fixed identification being configured for representing that the second virtual character is the virtual character first hit by the first virtual attack item; and displaying the third sub-identification as an associated identification when the second identification combination is displayed, the associated identification being associated with the number of times the first virtual attack item hits, when the second virtual character is hit by the first virtual attack item, the virtual character.

In this embodiment of this application, the foregoing number identification may include, but is not limited to, an ID of the first virtual character, a serial number of the first virtual character, and the like. The serial number of the first virtual character may include, but is not limited to, a serial number uniquely identifying the first virtual character in a camp in which the first virtual character is located.

In this embodiment of this application, the foregoing second sub-identification may include, but is not limited to, a fixed identification. For example, the position of the second virtual character is displayed as a larger circle than an identification of another virtual character, to more directly represent that the virtual character is first traced. This is easy for another player to learn the traced virtual character from the mini-map picture.

Figure 11:
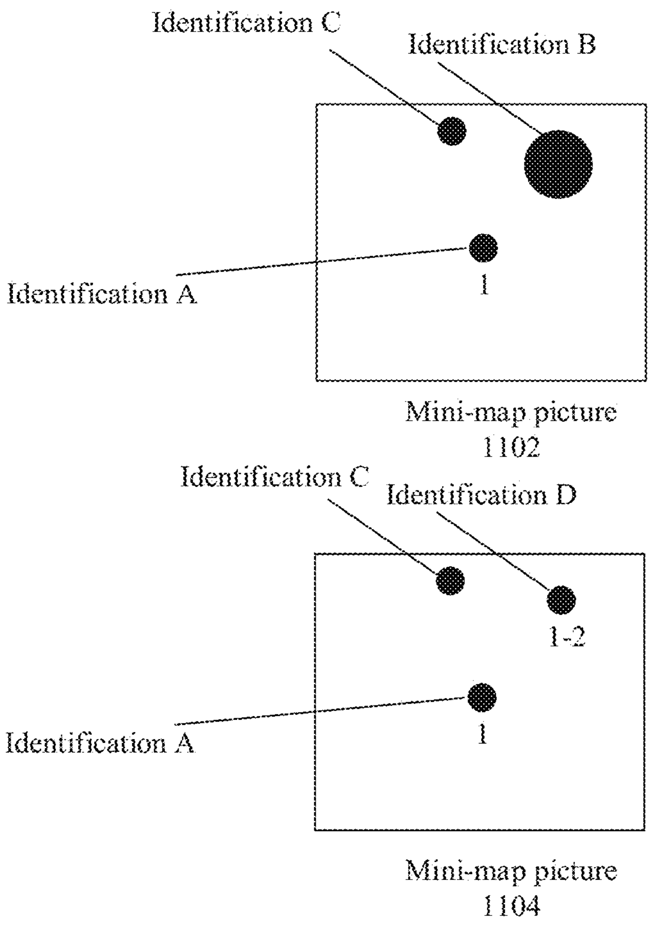
FIG. 11 is a schematic diagram of still another exemplary virtual character tracing method according to an embodiment of this application.

For example, FIG. 11 is a schematic diagram of still another virtual character tracing method according to an embodiment of the present disclosure. As shown in FIG. 11, identification A, identification B, identification C, and identification D are included. Identification A, identification B, and identification C are all identifications displayed on a mini-map picture 1102. Identification A represents a position at which a first virtual character is currently located. Number 1 represents a serial number of a camp or team in which the first virtual character is located, that is, the first sub-identification. Identification C is an identification of another virtual character. Identification B is a second sub-identification of the virtual character that is currently first traced. It may be learned that identification B is significantly larger than identification C, so that a second virtual character corresponding to identification B is the virtual character first hit by the foregoing first virtual attack item.

In addition, identification A, identification C, and identification D are all identifications displayed on a mini-map picture 1104. Identification A represents a position at which a first virtual character is currently located. Number 1 represents a serial number of a camp or team in which the first virtual character is located, that is, the first sub-identification. Identification C is an identification of another virtual character. Identification D is an identification associated with a number of times the first virtual attack item hits, when the first virtual attack item hits the second virtual character, a virtual character, and 1-2 represents that the second virtual character is the second virtual character hit by the first virtual character with serial number 1.

The foregoing description is only an example. This is not specifically limited in this embodiment.

According to this embodiment, the number identification indicating the serial number of the first virtual character may be displayed in the mini-map picture. The fixed identification indicating that the second virtual character is the virtual character first hit may be further displayed. The associated identification indicating the number of times the first virtual character controls, when the second virtual character is hit, the first virtual attack item to hit the virtual character may alternatively be displayed, so that the player can simply and accurately broadcast a specific position of a currently traced player when notifying another player, to improve tracing efficiency and optimize use experience of the player.

In some embodiments, the foregoing method further includes:

displaying a third identification combination when the first virtual character controls the first virtual attack item to hit a third virtual character and then to hit the second virtual character, the third identification combination including a first sub-identification and a fourth sub-identification, the first sub-identification being configured for identifying an identity of the first virtual character, the fourth sub-identification being configured for representing a number of hits that the first virtual character hits, when the first virtual character controls the first virtual attack item to hit the third virtual character, a virtual character, and the third virtual character being a virtual character in a different camp from the first virtual character; and displaying a fourth identification combination when a fourth virtual character controls the first virtual attack item to hit a fifth virtual character, the fourth identification combination including a fifth sub-identification and a sixth sub-identification, the fifth sub-identification being configured for identifying an identity of the fourth virtual character, the sixth sub-identification being configured for representing a number of hits that the fourth virtual character hits, when the fourth virtual character controls the first virtual attack item to hit the fifth virtual character, a virtual character, the fourth virtual character being a virtual character in the same camp as the first virtual character, and the fifth virtual character being a virtual character in a different camp from the fourth virtual character.

In this embodiment of this application, the foregoing third virtual character is a virtual character in a different camp from the first virtual character. The third virtual character may be in the same camp as the second virtual character or may be in a different camp from the second virtual character.

The third virtual character is the virtual character that the first virtual character uses the first virtual attack item to hit before. In other words, the first virtual character uses the first virtual attack item to hit the third virtual character first, and then uses the first virtual attack item to hit the second virtual character.

In this case, in the mini-map picture, the third identification combination associated with the third virtual character is simultaneously displayed.

Figure 12:
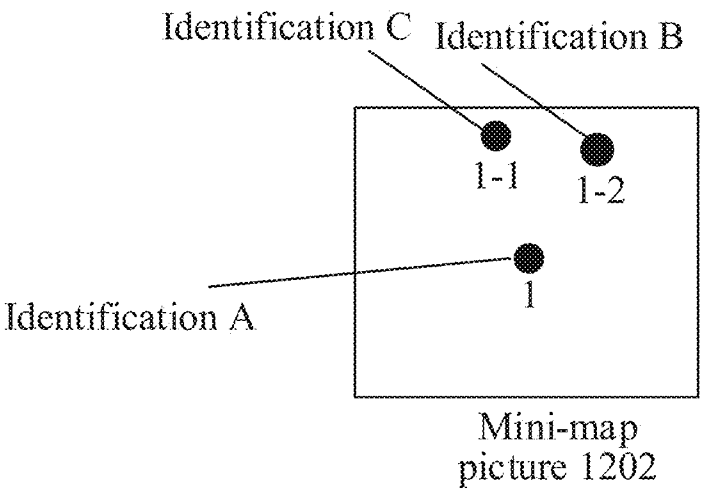
FIG. 12 is a schematic diagram of another exemplary virtual character tracing method according to an embodiment of this application.

For example, FIG. 12 is a schematic diagram of still another virtual character tracing method according to an embodiment of the present disclosure. As shown in FIG. 12, identification A, identification B, and identification C are included. Identification A, identification B, and identification C are all identifications displayed on a mini-map picture 1202. Identification A represents a position at which a first virtual character is currently located. Number 1 represents a serial number of a camp or team in which the first virtual character is located, that is, the first sub-identification. Identification C is an identification of a third virtual character. 1-1 represents that the third virtual character is a virtual character that the first virtual character controls a first virtual attack item first to hit. Identification B is an identification of a second virtual character. 1-2 represents that the second virtual character is a virtual character second hit by the first virtual character with serial number 1. 1 in 1-2 is the foregoing first sub-identification, and 2 in 1-2 is the foregoing fourth sub-identification.

In this embodiment of this application, the foregoing fourth virtual character is a virtual character in the same camp as the first virtual character. For example, the fourth virtual character is a character in the same team as the first virtual character. The foregoing fifth virtual character is a virtual character in a different camp from the fourth virtual character. For example, the fifth virtual character is a character in the same team as the second virtual character. The second virtual attack item is an attack item used by the fourth virtual character and may be configured to be identical or partly different from the first virtual attack item, provided that the same tracing effect as the first virtual attack item is also provided.

The foregoing fifth virtual character may alternatively be in a different camp from the second virtual character. In this case, the game application includes at least three different camps for combating each other. The foregoing fifth virtual character is a virtual character that the fourth virtual character uses the second virtual attack item to hit before. In other words, the fourth virtual character uses the second virtual attack item to first hit the fifth virtual character, and then the first virtual character uses the first virtual attack item to hit the second virtual character.

In this case, in the mini-map picture, the fourth identification combination and the target identification combination associated with both the fourth virtual character and fifth virtual character are simultaneously displayed.

Figure 13:
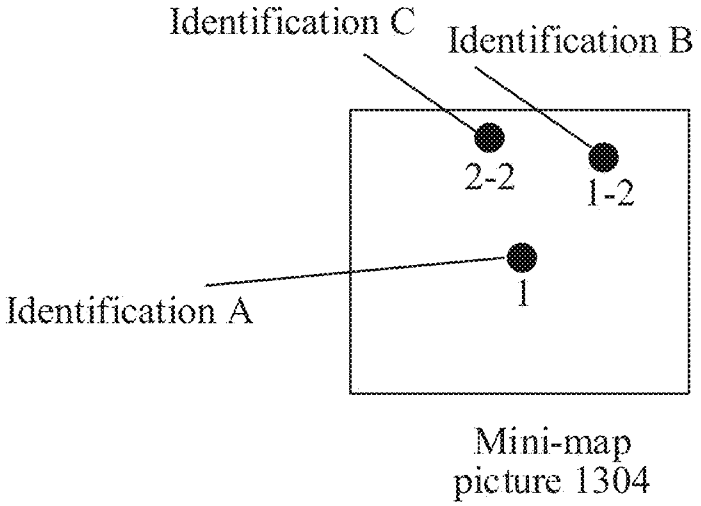
FIG. 13 is a schematic diagram of another exemplary virtual character tracing method according to an embodiment of this application.

For example, FIG. 13 is a schematic diagram of still another virtual character tracing method according to an embodiment of the present disclosure. As shown in FIG. 13, identification A, identification B, and identification C are included. Identification A, identification B, and identification C are all identifications displayed on a mini-map picture 1302. Identification A represents a position at which a first virtual character is currently located. Number 1 represents a serial number of a camp or team in which the first virtual character is located, that is, the first sub-identification. Identification C is an identification of a fifth virtual character. The first number 2 represents a serial number of a camp or team in which the fourth virtual character is located, that is, the foregoing fifth sub-identification. The second number 2 represents that the fifth virtual character is a virtual character second hit by the fourth virtual character with serial number 2, that is, the foregoing sixth sub-identification.

The foregoing description is only an example. This is not specifically limited in this embodiment of this application.

According to this embodiment, the first virtual character controlled by the player may be displayed on the mini-map picture. Positions of all the virtual characters starts to be traced after being hit. Simultaneously, the positions of all the virtual characters that are traced after being hit by the fourth virtual character in the same camp. In addition, an order in which each virtual character that is being traced after being hit is hit may be marked simultaneously. This is easy for a player to broadcast to a companion, enriching a social need in a game application, improving efficiency of tracing a virtual character in a game application, and optimizing game experience of a player.

In some embodiments, the foregoing method further includes:

displaying, in the mini-map picture, a position of a sixth virtual character located within a preset range of the second virtual character when the second virtual character is hit by the first virtual attack item, the sixth virtual character being a virtual character in a different camp from the first virtual character.

In this embodiment of this application, the foregoing sixth virtual character may include, but is not limited to, the same as the third virtual character, may be a virtual character in the same camp as the second virtual character, or may be a virtual character in a different camp from the second virtual character, and in a different camp from the first virtual character simultaneously.

Figure 14:
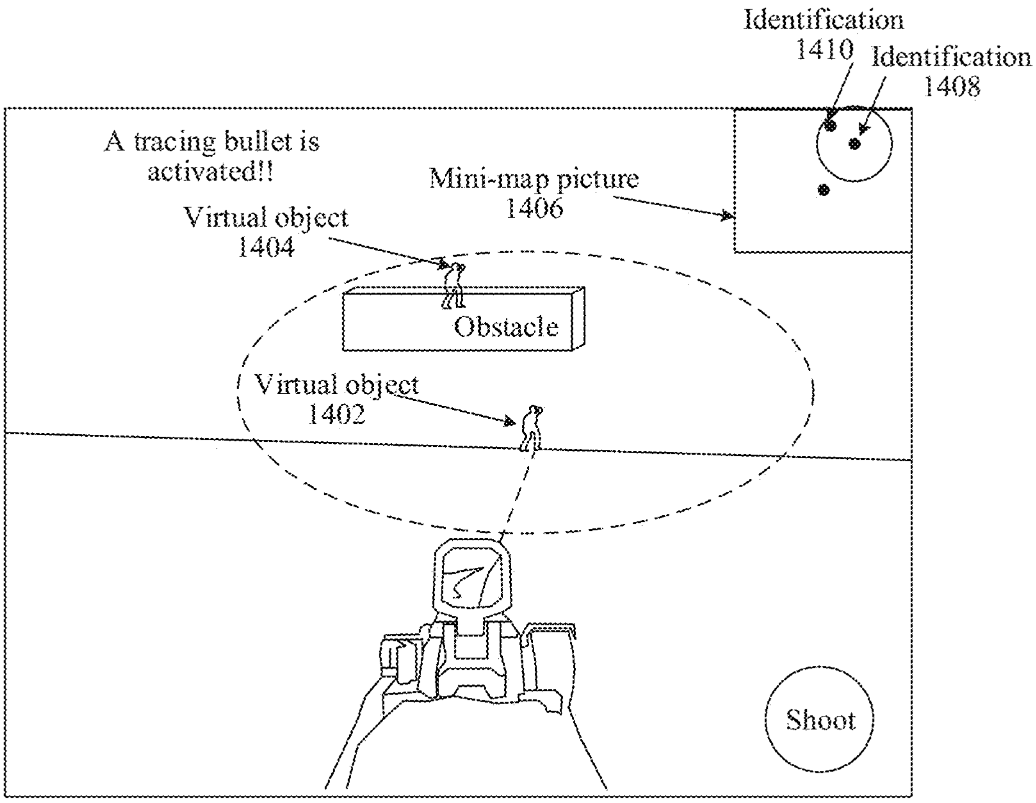
FIG. 14 is a schematic diagram of another exemplary virtual character tracing method according to an embodiment of this application.

For example, FIG. 14 is a schematic diagram of still another virtual character tracing method according to an embodiment of the present disclosure. As shown in FIG. 14, a virtual object 1402, a virtual object 1404, a mini-map picture 1406, an identification 1408, and an identification 1410 are included. In a case that a first virtual character controls a first virtual attack item to hit the virtual character 1402 (corresponding to the foregoing second virtual character), another virtual character centered on the virtual character 1402 and in a different camp from the first virtual character within a preset range may be detected. When the virtual character 1404 (corresponding to the foregoing sixth virtual character) is detected, the identification 1408 and the identification 1410 are displayed simultaneously on the mini-map picture 1406. The identification 1408 is configured for marking a position of the virtual object 1402, and the identification 1410 is configured for marking a position of the virtual object 1404.

The foregoing description is only an example. This is not specifically limited in this embodiment of this application.

In some embodiments, the foregoing method further includes:

displaying, in the mini-map picture, a real-time position of the second virtual character within preset duration when the second virtual character is hit by the first virtual attack item, and canceling display of the position of the second virtual character when the preset duration is reached.

For example, during tracing of the second virtual character, the moved position of the second virtual character is displayed in the mini-map picture when duration that the position of the second virtual character moves is within the preset duration.

During the tracing of the second virtual character, when the duration that the position of the second virtual character moves exceeds the preset duration, display of the moved position of the second virtual character is canceled in the mini-map picture.

In this embodiment of this application, preset duration may be configured for tracing effect of the foregoing first virtual attack item, so that the position of the second virtual character is displayed on the mini-map picture within the preset duration after a virtual character is hit by the first virtual attack item, and when the preset duration is reached, display of the position of the second virtual character is canceled. During the tracing of the second virtual character, the moved position of the second virtual character is continuously displayed when the preset duration is not reached, and after the preset duration is reached, display of the moved position of the second virtual character is canceled.

During the tracing of the second virtual character, the moved position of the second virtual character being continuously displayed when the preset duration is not reached may include, but is not limited, real-time displaying the position of the second virtual character during movement, and may further include, but is not limited to, displaying the moved position of the second virtual character at a preset time interval.

In some embodiments, the foregoing method further includes at least one of the following:

simultaneously displaying an orientation of the second virtual character when the position of the second virtual character is displayed in the mini-map picture;

simultaneously displaying, when the position of the second virtual character is displayed in the mini-map picture, a type of a virtual item owned by the second virtual character; and simultaneously displaying a virtual hit point scale of the second virtual character when the position of the second virtual character is displayed in the mini-map picture.

In this embodiment of this application, when the second virtual character is displayed, a direction in which the second virtual character faces may be displayed simultaneously, for example, displayed in a mini-map picture with a fan-shaped area. A center of the fan-shaped area is the position at which the second virtual character is located. When the second virtual character is displayed, a type of a virtual item owned by the second virtual character and a virtual hit point scale of the second virtual character may alternatively be displayed simultaneously. The type of the owned virtual item may include, but is not limited to, a type of a virtual item currently owned by the second virtual character, or may be a type of a virtual item preset by the second virtual character. The foregoing virtual hit point scale may include, but is not limited to, displaying a virtual hit point percentage, or an identification obtained by converting the percentage, for example, red for less, yellow for middle, and blue for more.

In some embodiments, the foregoing method further includes:

reducing a virtual hit point of the second virtual character when the second virtual character is hit by the first virtual attack item; and canceling display of the position of the second virtual character in the mini-map picture when the virtual hit point satisfies a preset condition.

In this embodiment of this application, the method may include, but is not limited to, determining that the virtual hit point satisfies the preset condition when the virtual hit point of the second virtual character decreases to a preset threshold. In this case, the canceling display of the position of the second virtual character may further include, but is not limited to, canceling display of the position of the second virtual character when the virtual hit point of the first virtual character decreases to the preset threshold.

In some embodiments, the foregoing method further includes:

transmitting first prompt information to a first virtual character set in the same camp as the first virtual character after the position of the second virtual character is displayed in the mini-map picture, the first prompt information being configured for prompting that the second virtual character is displayed in the mini-map picture; and transmitting second prompt information to the first virtual character set when the position of the second virtual character moves, the second prompt information being configured for prompting that the second virtual character is in a moving state and that a real-time position of the second virtual character is displayed in the mini-map picture.

In this embodiment of this application, the foregoing first prompt information and the second prompt information may include, but are not limited to, text information, voice information, and the like configured for prompting that the second virtual character is displayed in the mini-map picture or that the second virtual character is in a moving state, and a real-time position of the second virtual character is displayed in the mini-map picture.

Figure 15:
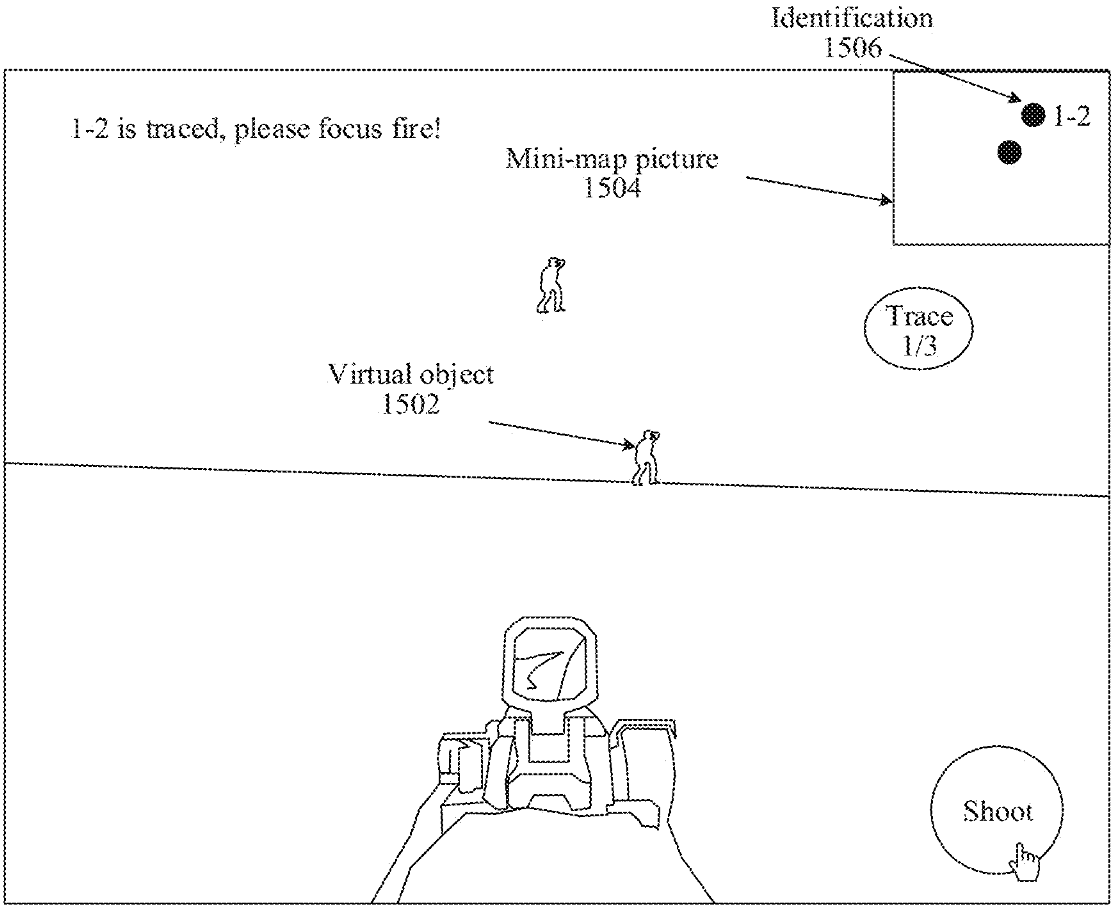
FIG. 15 is a schematic diagram of another exemplary virtual character tracing method according to an embodiment of this application.

For example, FIG. 15 is a schematic diagram of still another virtual character tracing method according to an embodiment of the present disclosure. As shown in FIG. 15, a virtual object 1502, a mini-map picture 1504, and an identification 1506 are included. In a case that a first virtual character controls a first virtual attack item to hit the virtual character 1502 (corresponding to the foregoing second virtual character), a text message of "1-2 is traced, please focus fire" may be transmitted to other virtual characters in the same camp. In this case, the identification 1506 is displayed on the mini-map picture simultaneously. After viewing the text message, another player may directly lock a position of the identification 1506 by using the mini-map picture, and then perform another game operation on the virtual character.

The foregoing description is only an example. This is not specifically limited in this embodiment of this application.

In some embodiments, the foregoing method further includes:

reducing a virtual hit point of the second virtual character when the second virtual character is hit by the first virtual attack item; and canceling display of a position of a sixth virtual character when a virtual hit point satisfies a preset condition, and maintaining displaying the position of the second virtual character.

In this embodiment of this application, when the virtual hit point of the second virtual character satisfies the preset condition, only display of the position of the sixth virtual character displayed because the second virtual character is traced is canceled, but the position of the second virtual character is maintained to be displayed.

For example, when the second virtual character is killed, the tracing effect of the second virtual character may be changed to only trace the second virtual character and stop tracing the sixth virtual character in the preset range of the second virtual character.

Figure 16:
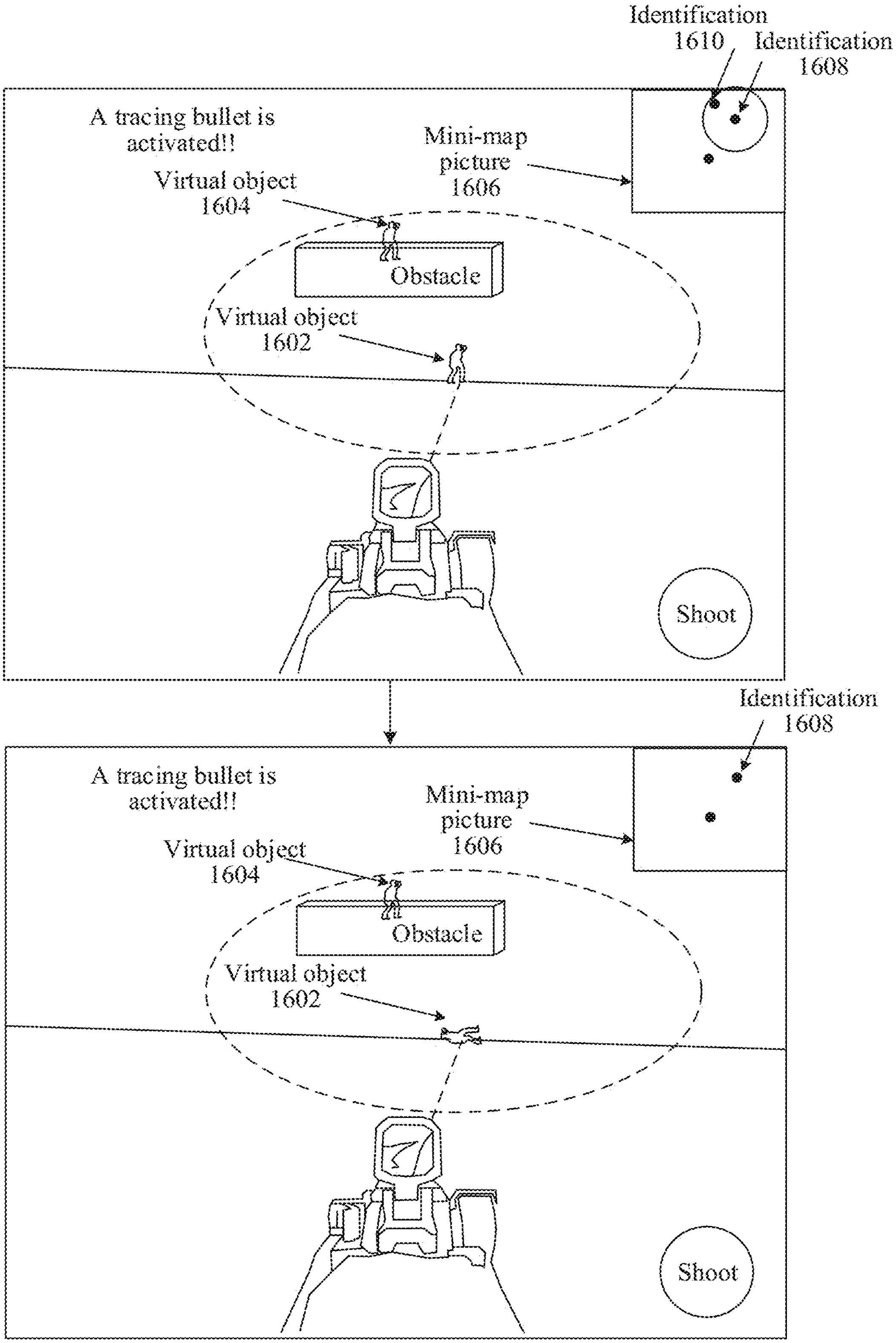
FIG. 16 is a schematic diagram of another exemplary virtual character tracing method according to an embodiment of this application.

For example, FIG. 16 is a schematic diagram of still another virtual character tracing method according to an embodiment of the present disclosure. As shown in FIG. 16, a virtual object 1602, a virtual object 1604, a mini-map picture 1606, an identification 1608, and an identification 1610 are included. In a case that a first virtual character controls a first virtual attack item to hit the virtual character 1602 (corresponding to the foregoing second virtual character), another virtual character centered on the virtual character 1602 and in a different camp from the first virtual character within a preset range may be detected. When the virtual character 1604 (corresponding to the foregoing sixth virtual character) is detected, the identification 1608 and the identification 1610 are displayed simultaneously on the mini-map picture 1606. The identification 1608 is configured for marking a position of the virtual object 1602, and the identification 1610 is configured for marking a position of the virtual object 1604. When a virtual hit point of the second virtual character satisfies a preset condition, display of the identification 1610 corresponding to the sixth virtual character is canceled, and the identification 1608 is maintained to be displayed. This is easy for a player to search for loot carried by the second virtual character.

The foregoing description is only an example. This is not specifically limited in this embodiment of this application.

In some embodiments, the foregoing method further includes at least one of the following:

During tracing of the second virtual character, when the position of the second virtual character moves, a moved position of the second virtual character is displayed in the mini-map picture, and an orientation of the second virtual character during movement is displayed simultaneously.

During the tracing of the second virtual character, when the position of the second virtual character moves, the moved position of the second virtual character is displayed in the mini-map picture, and a type of a virtual item owned by the second virtual character during movement is displayed simultaneously.

During the tracing of the second virtual character, when the position of the second virtual character moves, the moved position of the second virtual character is displayed in the mini-map picture, and a virtual hit point of the second virtual character during movement is displayed simultaneously.

In this embodiment of this application, during the tracing of the second virtual character, the orientation, the type of the owned virtual item, and the virtual hit point of the second virtual character may be continuously displayed. This may include, but is not limited to, being configured to display in real time, or may be configured to display at a preset time interval.

This embodiment of this application is further described in detail with reference to the following specific example.

This application provides a new mini-map tracking and scanning method. A player may add a tracking mark to own virtual bullet. After an enemy is hit by such bullet, not only the enemy is injured, but the enemy and whether there is an accomplice nearby are continuously displayed for a period of time, to trace a specific enemy player in a targeted manner.

Specific methods are as follows.

1. Fill tracing in a bullet:

After a game starts, three shots of tracing effect are configured for each player, player 1 clicks/taps a "trace" button. Provided that an enemy is hit by a subsequent bullet of player 1, the hit enemy is displayed on a mini-map picture of player 1 and a teammate of player 1 within a next 10 seconds. Unless the hit enemy is eventually killed, a tracing effect for the enemy ends immediately after being killed.

2. Marking distinction method:

Currently, most of game applications are games in which teams are divided into different camps to fight. There are greater than or equal to five players in a team. If there is a first enemy hit by player 1 using a tracing bullet, a portrait of the enemy flashes red 1-1. If there is a second enemy hit by player 1, the enemy flashes red 1-2 on the mini-map picture. In this case, player 1 may notify the teammate whether 1-1 and 1-2 are traced by using a voice or text. Certainly, the marking herein may alternatively be marked using another method. This method is simple and has high discrimination.

For example, the method may be summarized in the following table.

| Player | First hit enemy | Second hit enemy | Third hit enemy |
|---|---|---|---|
| Number 1 | 1-1 | 1-2 | 1-3 |
| Number 2 | 2-1 | 2-2 | 2-3 |
| Number 3 | 3-1 | 3-2 | 3-3 |
| Number 4 | 4-1 | 4-2 | 4-3 |
| Number 5 | 5-1 | 5-2 | 5-3 |

An effect after an enemy is hit:

When the enemy is hit by a virtual bullet that increases a tracing effect, if the enemy starts to escape, a position of the enemy during escape is still displayed in the mini-map picture, and an accomplice within five meters of a circle near the enemy may be further displayed simultaneously.

In the specific implementation of this application, relevant data such as user information is involved. In a case that the foregoing embodiments of this application are applied to a specific product or technology, a permission or consent of a user is required, and collection, use, and processing of the relevant data need to comply with relevant laws, regulations, and standards of relevant countries and regions.

To simplify the description, the foregoing method embodiments are described as a series of action combination. However, a person skilled in the art is to know that this application is not limited to any described sequence of the action, because some operations can use other sequences or can be executed simultaneously according to this application. In addition, a person skilled in the art also knows that all embodiments described in the specification are exemplary embodiments, and the related actions and modules are not necessarily required by this application.

Figure 17:
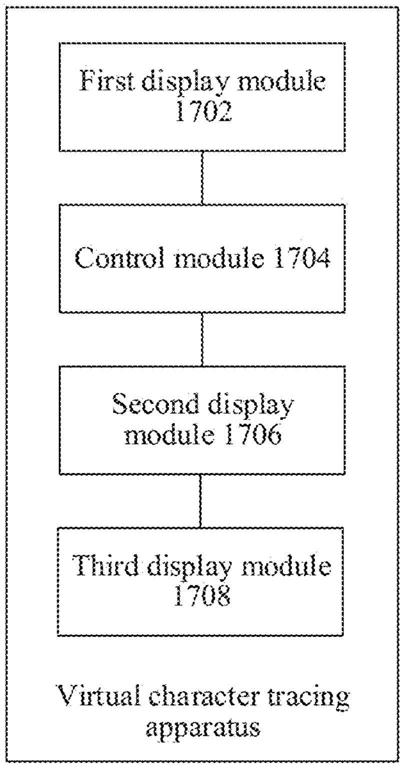
FIG. 17 is a schematic diagram of a structure of an exemplary virtual character tracing apparatus according to an embodiment of this application.

According to another aspect of embodiments of this application, a virtual character tracing apparatus configured to implement the foregoing virtual character tracing method is further provided. As shown in FIG. 17, the apparatus includes:

a first display module 1702, configured to display, in a target application, a virtual scene in which a first virtual character is located and a mini-map picture;

a control module 1704, configured to control, in response to a target trigger operation, the first virtual character to launch a first virtual attack item, the first virtual attack item being configured for triggering, when a virtual character in a different camp from the first virtual character is hit, tracing of the hit virtual character;

a second display module 1706, configured to display a position of a second virtual character in the mini-map picture when the second virtual character in a different camp from the first virtual character is hit by the first virtual attack item; and a third display module 1708, configured to display a moved position of the second virtual character in the mini-map picture when the position of the second virtual character moves.

In some embodiments, the apparatus is further configured to:

determine target identity information of the second virtual character when the second virtual character is hit by the first virtual attack item, the target identity information being configured for indicating identity information corresponding to the second virtual character in the virtual scene; and add a target identity identification for the second virtual character based on the target identity information, and display the target identity identification in the mini-map picture, the target identity identification being configured for representing a position of the second virtual character in the virtual scene.

In some embodiments, the apparatus is further configured to: determine a number of current launches of the first virtual attack item when a total number of times the first virtual attack item is allowed to be launched is a preset number of times, and the second virtual character is hit by the first virtual attack item, the number of current launches being a number of launches determined after the first virtual attack item hits the second virtual character, and the number of current launches being less than or equal to the preset number of times; and display, based on the number of current launches, a target identification combination at the position at which the second virtual character is located in the mini-map picture, the target identification combination being configured for representing a number of times the first virtual attack item hits, when the second virtual character is hit by the first virtual attack item, a virtual character.

In some embodiments, the apparatus is further configured to:

determine a number of current hits of the first virtual attack item when the second virtual character is hit by the first virtual attack item, the number of current hits being a number of times the first virtual attack item currently hits a virtual character; and display, based on the number of current hits, a second target identification combination at the position at which the second virtual character is located in the mini-map picture, the second target identification combination being configured for representing a number of times the first virtual attack item hits, after the second virtual character is hit by the first virtual attack item, a virtual character.

In some embodiments, the apparatus is further configured to:

display a first identification combination when the number of current hits represents that the second virtual character is a virtual object first hit by the first virtual attack item, the first identification combination including a first sub-identification and a second sub-identification, the first sub-identification being configured for identifying an identity of the first virtual character, and the second sub-identification representing that the second virtual character is a virtual character first hit by the first virtual attack item; and display a second identification combination when the number of current hits represents that the second virtual character is not the virtual object first hit by the first virtual attack item, the second identification combination including the first sub-identification and a third sub-identification, and the third sub-identification being configured for representing a number of times the first virtual attack item hits, when the second virtual character is hit by the first virtual attack item, a virtual character.

In some embodiments, the apparatus is further configured to:

display, when the first identification combination is displayed, the first sub-identification as a number identification, and display the second sub-identification as a fixed identification, the number identification being configured for representing the first virtual character launching the first virtual attack item, and the fixed identification being configured for representing that the second virtual character is the virtual character first hit by the first virtual attack item; and display the third sub-identification as an associated identification when the second identification combination is displayed, the associated identification being associated with the number of times the first virtual attack item hits, when the second virtual character is hit by the first virtual attack item, the virtual character.

In some embodiments, the apparatus is further configured to:

display a third identification combination in the mini-map picture when the first virtual character controls the first virtual attack item to hit a third virtual character and then to hit the second virtual character, the third identification combination including a first sub-identification and a fourth sub-identification, the first sub-identification being configured for identifying an identity of the first virtual character, the fourth sub-identification being configured for representing a number of hits that the first virtual character hits, when the first virtual character controls the first virtual attack item to hit the third virtual character, a virtual character, and the third virtual character being a virtual character in a different camp from the first virtual character; and display a fourth identification combination in the mini-map picture when a fourth virtual character controls the first virtual attack item to hit a fifth virtual character, the fourth identification combination including a fifth sub-identification and a sixth sub-identification, the fifth sub-identification being configured for identifying an identity of the fourth virtual character, the sixth sub-identification being configured for representing a number of hits that the fourth virtual character hits, when the fourth virtual character controls the first virtual attack item to hit the fifth virtual character, a virtual character, the fourth virtual character being a virtual character in the same camp as the first virtual character, and the fifth virtual character being a virtual character in a different camp from the fourth virtual character.

In some embodiments, the apparatus is further configured to:

display, in the mini-map picture, a position of a sixth virtual character located within a preset range of the second virtual character when the second virtual character is hit by the first virtual attack item, the sixth virtual character being a virtual character in a different camp from the first virtual character.

In some embodiments, the apparatus is further configured to:

display, in the mini-map picture, a real-time position of the second virtual character within preset duration when the second virtual character is hit by the first virtual attack item, and cancel display of the position of the second virtual character when the preset duration is reached.

In some embodiments, the apparatus is further configured to perform at least one of the following methods:

simultaneously displaying an orientation of the second virtual character when the position of the second virtual character is displayed in the mini-map picture;

simultaneously displaying, when the position of the second virtual character is displayed in the mini-map picture, a type of a virtual item owned by the second virtual character; and simultaneously displaying a virtual hit point scale of the second virtual character when the position of the second virtual character is displayed in the mini-map picture.

In some embodiments, the apparatus is further configured to:

reduce a virtual hit point of the second virtual character when the second virtual character is hit by the first virtual attack item; and cancel display of the position of the second virtual character in the mini-map picture when the virtual hit point satisfies a preset condition.

In some embodiments, the apparatus is further configured to:

transmit first prompt information to a first virtual character set in the same camp as the first virtual character after the position of the second virtual character is displayed in the mini-map picture, the first prompt information being configured for prompting that the second virtual character is displayed in the mini-map picture; and transmit second prompt information to the first virtual character set when the position of the second virtual character moves, the second prompt information being configured for prompting that the second virtual character is in a moving state and that a real-time position of the second virtual character is displayed in the mini-map picture.

According to an aspect in this application, a computer program product is provided. The computer program product includes a computer program/instruction. The computer program/instruction includes program code used for performing the method shown in the flowchart. In such an embodiment, the computer program may be downloaded and installed from a network by using a communication part 1809, and/or installed from a removable medium 1811. When the computer program is executed by a central processing unit 1801, various functions provided in the embodiment of this application are performed.

The sequence numbers of the foregoing embodiments of this application are merely for description, and do not imply the preference among embodiments.

Figure 18:
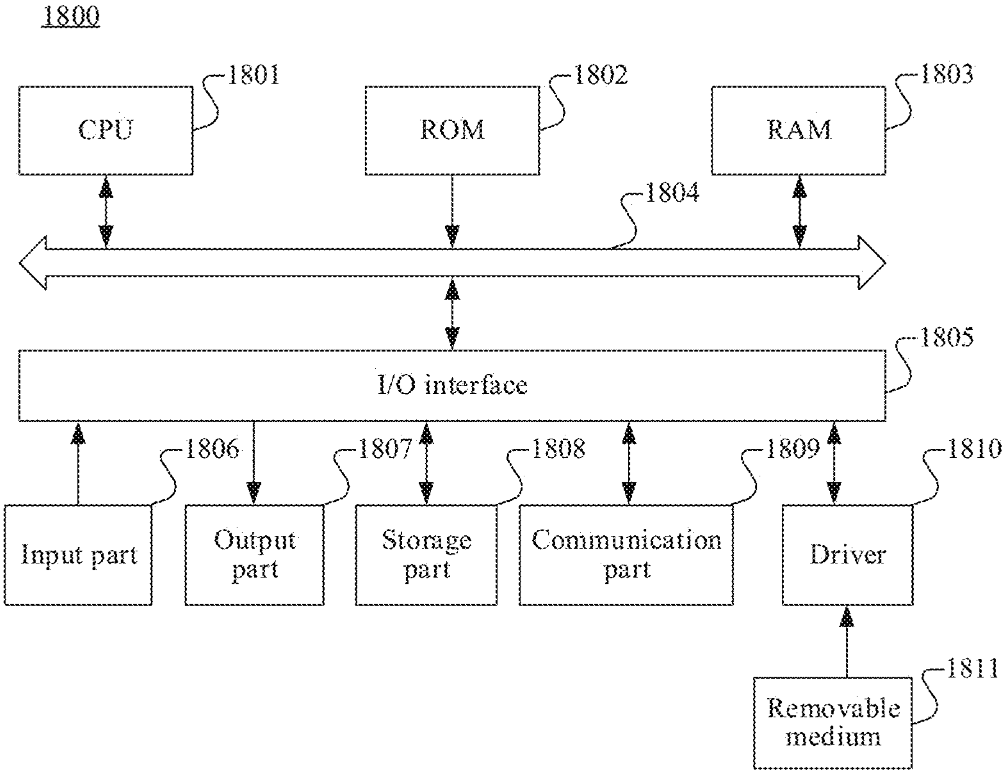
FIG. 18 is a schematic diagram of a structure of an exemplary virtual character tracing product according to an embodiment of this application.

FIG. 18 is a schematic block diagram for implementing a structure of a computer system of an electronic device according to an embodiment of this application.

The computer system 1800 of the electronic device shown in FIG. 18 is merely an example, and does not constitute any limitation on functions and use ranges of this embodiment of this application.

As shown in FIG. 18, the computer system 1800 includes a central processing unit (CPU) 1801, which may execute various proper actions and processing based on a program stored in a read-only memory (ROM) 1802 or a program loaded from a storage part 1808 into a random access memory (RAM) 1803. The random access memory 1803 further stores various programs and data required by system operations. The central processing unit 1801, the read-only memory 1802, and the random access memory 1803 are connected to each other through a bus 1804. An input/output interface (that is, an I/O interface) 1805 is also connected to the bus 1804.

The following components are connected to the input/output interface 1805:

an input part 1806 including a keyboard, a mouse, and the like, an output part 1807 including a cathode ray tube (CRT), a liquid crystal display (LCD), a speaker, and the like, a storage part 1808 including a hard disk, and the like, and a communication part 1809 including a network interface card such as a local area network card, and a modem. The communication part 1809 performs communication processing over a network such as the Internet. A driver 1180 is also connected to the input/output interface 1805 as needed. A removable medium 1811, such as a magnetic disk, an optical disc, a photomagnetic disk, or a semiconductor memory, is installed on the drive 1180 as needed, so that a computer program read from the removable medium is installed into the storage part 1808 as needed.

Particularly, according to the embodiments of this application, the processes described in each method flowchart may be implemented as computer software programs. For example, an embodiment of this application includes a computer program product, the computer program product includes a computer program stored in a non-transitory computer-readable medium, and the computer program includes program code used for performing the methods shown in the flowcharts. In such an embodiment, the computer program may be downloaded and installed from a network by using a communication part 1809, and/or installed from a removable medium 1811. When the computer program is executed by the central processing unit 1801, various functions defined in the system of this application are performed.

Figure 19:
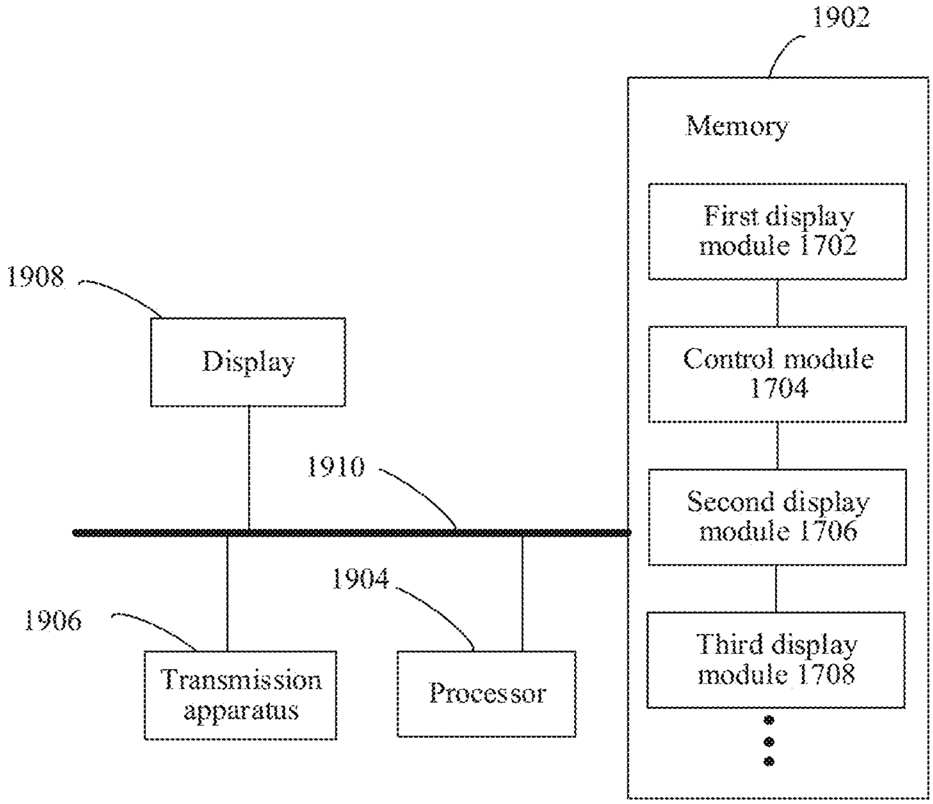
FIG. 19 is a schematic diagram of a structure of an electronic device according to an embodiment of this application.

According to still another aspect in embodiments of this application, an electronic device for implementing the foregoing virtual character tracing method is further provided. The electronic device may be the terminal device or the server as shown in FIG. 1. In this embodiment, an example in which the electronic device is the terminal device is used for description. As shown in FIG. 19, the electronic device includes a memory 1902 and a processor 1904. The memory 1902 has a computer program stored therein, and the processor 1904 is configured to perform operations in any of the foregoing method embodiments by a computer program.

In this embodiment, the foregoing electronic device may be located in at least one of a plurality of network devices in a computer network.

In this embodiment, the processor may be configured to execute the computer program to perform the following operations.

S1: Display, in a target application, a virtual scene in which a first virtual character is located and a mini-map picture.

S2: Control, in response to a target trigger operation, the first virtual character to launch a first virtual attack item. The first virtual attack item is configured for triggering, when a virtual character in a different camp from the first virtual character is hit, tracing of the hit virtual character.

S3: Display a position of a second virtual character in the mini-map picture when the second virtual character in a different camp from the first virtual character is hit by the first virtual attack item.

S4: Display a moved position of the second virtual character in the mini-map picture when the position of the second virtual character moves.

In some embodiments, a person of ordinary skill in the art may understand that the structure shown in FIG. 19 is merely an example. The electronic device may alternatively be a terminal device, such as a smartphone (for example, an Android phone and an iOS phone), a tablet computer, a palmtop computer, a mobile Internet device (MID), or a PAD. FIG. 19 does not constitute a limitation on a structure of the foregoing electronic device. For example, the electronic device may further include more or fewer components (for example, a network interface and the like) than those shown in FIG. 19, or has a configuration different from that shown in FIG. 19.

The memory 1902 may be configured to store a software program and module, such as a program instruction/module corresponding to the virtual character tracing method and apparatus in embodiments of this application. The processor 1904 runs the software program and module stored in the memory 1902, to perform various function applications and data processing, in other words, implement the foregoing virtual character tracing method. The memory 1902 may include a high-speed random memory, and may further include a non-volatile memory, for example, one or more magnetic storage apparatuses, a flash memory, or another non-volatile solid-state memory. In some embodiments, the memory 1902 may further include memories remotely disposed relative to the processor 1904, and the remote memories may be connected to a terminal over a network. Examples of the network include, but are not limited to, the Internet, an intranet, a local area network, a mobile communication network, and a combination thereof. The memory 1902 may be specifically, but is not limited to, configured to store information such as a virtual character.

As an example, as shown in FIG. 19, the foregoing memory 1902 may include, but is not limited to, a first display module 1702, a control module 1704, a second display module 1706, and a third display module 1708 in the virtual character tracing apparatus. In addition, the foregoing memory may further include, but is not limited to, another module unit in the foregoing virtual character tracing apparatus. Details are not described again in this example.

In some embodiments, a transmission apparatus 1906 is configured to receive or send data over a network. Specific examples of the foregoing network include a wired network and a wireless network. In an example, the transmission apparatus 1906 includes a network interface controller (NIC). The network interface controller may be connected to another network device and a router by using a network cable, to communicate with the Internet or a local area network. In an example, the transmission apparatus 1906 is a radio frequency (RF) module. The radio frequency module communicates with the Internet in a wireless manner.

In addition, the electronic device further includes: a display 1908, configured to display the game picture; and a connection bus 1910, configured to connect various module components in the foregoing electronic device.

In another embodiment, the foregoing terminal device or server may be a node in a distributed system. The distributed system may be a blockchain system, and the blockchain system may be a distributed system formed by connecting a plurality of nodes through network communication. A peer to peer (P2P) network may be formed between the nodes. Any form of a computing device, such as the server, the terminal, and another electronic device, may become a node in the blockchain system by joining the peer-to-peer network.

According to an aspect in this application, a non-transitory computer-readable storage medium is provided. A processor of a computer device reads a computer program from the computer-readable storage medium. The processor executes the computer program, so that the computer device performs the virtual character tracing method provided in various implementations of the foregoing virtual character tracing aspect.

In this embodiment, the computer-readable storage medium may be configured to store a computer program configured for performing the following operations:

S1: Display, in a target application, a virtual scene in which a first virtual character is located and a mini-map picture.

S2: Control, in response to a target trigger operation, the first virtual character to launch a first virtual attack item. The first virtual attack item is configured for triggering, when a virtual character in a different camp from the first virtual character is hit, tracing of the hit virtual character.

S3: Display a position of a second virtual character in the mini-map picture when the second virtual character in a different camp from the first virtual character is hit by the first virtual attack item.

S4: Display a moved position of the second virtual character in the mini-map picture when the position of the second virtual character moves.

In this embodiment, a person of ordinary skill in the art may understand that, all or some operations in the methods of the foregoing embodiments may be performed by a program instructing hardware of the terminal device. The program may be stored in a computer-readable storage medium. The storage medium may include: a flash drive, a read-only memory (ROM), a random access memory (RAM), a magnetic disk, an optical disc, and the like.

The sequence numbers of the foregoing embodiments of this application are merely for description, and do not imply the preference among embodiments.

When the integrated unit in the foregoing embodiments is implemented in the form of a software functional unit and sold or used as an independent product, the integrated unit may be stored in the foregoing computer-readable storage medium. Based on such understanding, the technical solutions of this application essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of operations of the method in embodiments of this application.

In the foregoing embodiments of this application, the descriptions of embodiments have respective focuses. For a part that is not described in detail in an embodiment, refer to related descriptions in other embodiments.

In the several embodiments provided in this application, the disclosed client may be implemented in another manner. The apparatus embodiments described above are merely examples. For example, the division into the units is merely the division of logic functions, and may use other division manners during actual implementation. For example, a plurality of units or components may be combined, or may be integrated into another system, or some features may be ignored or not performed. In addition, the displayed or discussed couplings, or direct couplings, or communication connections may be implemented by using some interfaces. The indirect couplings or communication connections between the units or modules may be implemented in electrical or other forms.

The units described as separate components may or may not be physically separated, and components displayed as units may or may not be physical units, may be located in one place, or may be distributed on a plurality of network units. Some or all of the units may be selected according to actual needs to achieve the objectives of the solutions of embodiments.

In addition, functional units in embodiments of this application may be integrated into one processing unit, each of the units may exist alone physically, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make various improvements and modifications without departing from the principle of this application, and the improvements and modifications are also to be considered as the protection scope of this application.

What is claimed is:

1. A virtual character tracing method performed by a computer device, the method comprising:

displaying a virtual scene and a mini-map picture, the virtual scene including a first virtual character;

in response to a target trigger operation, controlling the first virtual character to launch a first virtual attack item at a second virtual character in a different camp from the first virtual character;

displaying a movement of a position of the second virtual character in the mini-map picture after the second virtual character is directly hit by the first virtual attack item; and after the second virtual character moves from a first position to a second position in the virtual scene, displaying, in the mini-map picture, a position of a third virtual character located within a preset range of the second virtual character at the second position, wherein a distance between the first position and the second position is greater than the preset range and the third virtual character is a virtual character from the same camp as the second virtual character.

2. The method according to claim 1, further comprising: displaying target identity information of the second virtual character in the mini-map picture after the second virtual character is hit by the first virtual attack item.

3. The method according to claim 1, further comprising: displaying, in the mini-map picture, a real-time position of the second virtual character within preset duration after the second virtual character is hit by the first virtual attack item; and canceling display of the position of the second virtual character when the preset duration is reached.

4. The method according to claim 1, further comprising: simultaneously displaying an orientation of the second virtual character, a type of a virtual item owned by the second virtual character, and a virtual hit point scale of the second virtual character when the position of the second virtual character is displayed in the mini-map picture.

5. The method according to claim 1, further comprising: canceling display of the position of the second virtual character in the mini-map picture when a virtual hit point of the second virtual character satisfies a preset condition.

6. The method according to claim 1, further comprising: transmitting first prompt information to a first virtual character set in the same camp as the first virtual character after the position of the second virtual character is displayed in the mini-map picture, the first prompt information prompting that a real-time position of the second virtual character is displayed in the mini-map picture.

7. An electronic device, comprising a memory and a processor, the memory having a computer program stored therein, and the computer program, when executed by the processor, causing the electronic device to perform a virtual character tracing method including:

displaying a virtual scene and a mini-map picture, the virtual scene including a first virtual character;

in response to a target trigger operation, controlling the first virtual character to launch a first virtual attack item at a second virtual character in a different camp from the first virtual character;

displaying a movement of a position of the second virtual character in the mini-map picture after the second virtual character is directly hit by the first virtual attack item; and after the second virtual character moves from a first position to a second position in the virtual scene, displaying, in the mini-map picture, a position of a third virtual character located within a preset range of the second virtual character at the second position, a distance between the first position and the second position being greater than the preset range and the third virtual character being a virtual character from the same camp as the second virtual character.

8. The electronic device according to claim 7, wherein the method further comprises:

displaying target identity information of the second virtual character in the mini-map picture after the second virtual character is hit by the first virtual attack item.

9. The electronic device according to claim 7, wherein the method further comprises:

displaying, in the mini-map picture, a position of a third virtual character located within a preset range of the second virtual character after the second virtual character is hit by the first virtual attack item, the third virtual character being a virtual character from the same camp as the second first virtual character.

10. The electronic device according to claim 7, wherein the method further comprises:

displaying, in the mini-map picture, a real-time position of the second virtual character within preset duration after the second virtual character is hit by the first virtual attack item; and canceling display of the position of the second virtual character when the preset duration is reached.

11. The electronic device according to claim 7, wherein the method further comprises:

simultaneously displaying an orientation of the second virtual character, a type of a virtual item owned by the second virtual character, and a virtual hit point scale of the second virtual character when the position of the second virtual character is displayed in the mini-map picture.

12. The electronic device according to claim 7, wherein the method further comprises:

canceling display of the position of the second virtual character in the mini-map picture when a virtual hit point of the second virtual character satisfies a preset condition.

13. The electronic device according to claim 7, wherein the method further comprises:

transmitting first prompt information to a first virtual character set in the same camp as the first virtual character after the position of the second virtual character is displayed in the mini-map picture, the first prompt information prompting that a real-time position of the second virtual character is displayed in the mini-map picture.

14. A non-transitory computer-readable storage medium, comprising a computer program stored thereon, the computer program, when executed by a processor of an electronic device, causing the electronic device to perform a virtual character tracing method including:

displaying a virtual scene and a mini-map picture, the virtual scene including a first virtual character;

in response to a target trigger operation, controlling the first virtual character to launch a first virtual attack item at a second virtual character in a different camp from the first virtual character;

displaying a movement of a position of the second virtual character in the mini-map picture after the second virtual character is directly hit by the first virtual attack item; and after the second virtual character moves from a first position to a second position in the virtual scene, displaying, in the mini-map picture, a position of a third virtual character located within a preset range of the second virtual character at the second position, wherein a distance between the first position and the second position is greater than the preset range and the third virtual character is a virtual character from the same camp as the second virtual character.

15. The non-transitory computer-readable storage medium according to claim 14, wherein the method further comprises:

displaying target identity information of the second virtual character in the mini-map picture after the second virtual character is hit by the first virtual attack item.

16. The non-transitory computer-readable storage medium according to claim 14, wherein the method further comprises:

displaying, in the mini-map picture, a position of a third virtual character located within a preset range of the second virtual character after the second virtual character is hit by the first virtual attack item, the third virtual character being a virtual character from the same camp as the second first virtual character.

17. The non-transitory computer-readable storage medium according to claim 14, wherein the method further comprises:

displaying, in the mini-map picture, a real-time position of the second virtual character within preset duration after the second virtual character is hit by the first virtual attack item; and canceling display of the position of the second virtual character when the preset duration is reached.

18. The non-transitory computer-readable storage medium according to claim 14, wherein the method further comprises:

canceling display of the position of the second virtual character in the mini-map picture when a virtual hit point of the second virtual character satisfies a preset condition.

19. The non-transitory computer-readable storage medium according to claim 14, wherein the method further comprises:

transmitting first prompt information to a first virtual character set in the same camp as the first virtual character after the position of the second virtual character is displayed in the mini-map picture, the first prompt information prompting that a real-time position of the second virtual character is displayed in the mini-map picture.

* * * * *